United States Patent [19]

Komuro et al.

[11] Patent Number: 5,386,418
[45] Date of Patent: Jan. 31, 1995

[54] METHOD FOR SYNCHRONIZING SYNCHRONOUS DATA COMMUNICATION NETWORK AND COMMUNICATION DEVICE USED IN THE SYNCHRONOUS DATA COMMUNICATION NETWORK

[75] Inventors: Yasuko Komuro; Noboru Yajima; Hiroshi Yoshida, all of Kawasaki, Japan

[73] Assignee: Fujitsu Limited, Japan

[21] Appl. No.: 39,374

[22] PCT Filed: Aug. 18, 1992

[86] PCT No.: PCT/JP92/01042

§ 371 Date: May 4, 1993

§ 102(e) Date: May 4, 1993

[87] PCT Pub. No.: WO93/04545

PCT Pub. Date: Mar. 4, 1993

[30] Foreign Application Priority Data

Aug. 19, 1991 [JP] Japan .................. 3-206689

[51] Int. Cl.⁶ .......................................... H04L 7/04
[52] U.S. Cl. .................................. 370/103; 375/107; 375/108
[58] Field of Search .................. 370/100.1, 103, 105; 375/106, 107, 108; 371/8.2, 47.1

[56] References Cited

U.S. PATENT DOCUMENTS

| | | | |
|---|---|---|---|
| 4,794,596 | 12/1988 | Gloyne et al. | 370/103 |
| 4,847,836 | 7/1989 | Keilholz | 375/108 |
| 5,068,877 | 11/1991 | Near et al. | 375/107 |

FOREIGN PATENT DOCUMENTS

| | | |
|---|---|---|
| 6422137 | 1/1989 | Japan . |
| 1208047 | 8/1989 | Japan . |
| 1316443 | 12/1989 | Japan . |
| 2100440 | 4/1990 | Japan . |

*Primary Examiner*—Benedict V. Safourek
*Attorney, Agent, or Firm*—Greer, Burns & Crain, Ltd.

[57] ABSTRACT

A method of switching from one synchronizing signal source to another in a synchronous data communication network in which a plurality of stations are connected to each other via lines and A plurality of synchronizing signal sources are provided inside or outside the stations; the when a failure occurs a synchronizing signal source is replaced by another synchronizing signal source in correspondence to the failure so that the data communication may be continued. Specifically, flag bit data, indicating whether or not the synchronizing signal transmitted via the line is available, are set in the signal including the synchronizing signal and transmitted via the line. When a failure occurs in any of the plurality of synchronizing signal sources, a table provided in each station and specifying the order of priority for selection of a synchronizing signal source is referred to, and a synchronizing signal source is selected for each station in accordance with said flag bit data. Each station switches from the currently selected synchronizing signal source to the synchronizing signal source selected.

17 Claims, 43 Drawing Sheets

FIG. 4 FIRST EMBODIMENT OF PRESENT INVENTION
FIRST STAGE OF DISCONNECTION OF EXTERNAL SYNCHRONIZING SIGNAL SOURCE EXT(P)

FIG. 18 SECOND EMBODIMENT OF PRESENT INVENTION
FIRST STAGE OF RECOVERY OF LINE

FIG.19 SECOND EMBODIMENT OF PRESENT INVENTION
SECOND STAGE OF RECOVERY OF LINE

FIG. 22 THIRD EMBODIMENT NORMAL STATE

THIRD EMBODIMENT FIRST STAGE OF
OCCURRENCE OF FAILURE

OCCURRENCE OF FAILURE BETWEEN A AND D
→ STATION D DETECTS FAILURE
→ DETECT DISCONNECTION IN LINE (W)
→ SEND *S TO LINE (I)
→ SELECT INT
  SEND *S TO LINE (E)

THIRD EMBODIMENT SECOND STAGE OF OCCURRENCE OF FAILURE

STATION C DETECTS S ON LINE (W)

SWITCH SELECTION FROM LINE (W) TO LINE (E), REVERSE FLAG BIT DATA SUPPLIED TO LINE (W) FROM *S TO S AND SEND REVERSED VERSION

STATION B DETECTS *S ON LINE (W)

THIRD EMBODIMENT THIRD STAGE OF OCCURRENCE OF FAILURE

STATION D DETECTS S ON LINE (E)
↓
SWITCH SELECTION FROM INT TO LINE (E)
AND REVERSE FLAG BIT DATA SUPPLIED TO LINE (W)
FROM *S TO S AND SEND REVERSED VERSION

THIRD EMBODIMENT FIRST STAGE OF RECOVERY FROM FAILURE

FAILURE BETWEEN A AND D ELIMINATED

STATION D DETECTS S ON LINE(W)

SELECT LINE(W)
SEND*S TO LINE(W)
SEND S TO LINE(E)

FIG. 27 THIRD EMBODIMENT SECOND STAGE OF RECOVERY FROM FAILURE

FIG.28 FOURTH STAGE NORMAL STATE

FOURTH EMBODIMENT SECOND STAGE OF OCCURRENCE OF FAILURE

STATION C DETECTS *S ON LINE(W)

DETECT*S IN LINE(E) →
SELECT INT

FOURTH EMBODIMENT THIRD STAGE OF OCCURRENCE OF FAILURE

STATION D DETECTS *S ON LINE (W)

SELECT LINE(E)
SEND S TO LINE(W)

FIG. 32 FOURTH EMBODIMENT FOURTH STAGE OF OCCURRENCE OF FAILURE

STATION C DETECTS S ON LINE (E)

SELECT LINE (E) AND CHANGE FLAG BIT DATA SUPPLIED TO LINE (W) FROM *S TO S

FOURTH EMBODIMENT FIFTH STAGE OF OCCURRENCE OF FAILURE

STATION D DETECTS S ON LINE (E)

SWITCH SELECTION FROM INT TO LINE (E) AND
CHANGE FLAG BIT SUPPLIED TO DATA LINE(W)
FROM *S TO S

FOURTH EMBODIMENT SECOND STAGE OF RECOVERY FROM FAILURE

STATION C DETECTS S ON LINE (W)

SWITCH SELECTION FROM LINE (E) TO LINE (W)
AND CHANGE FLAG BIT DATA SUPPLIED TO LINE (W)
FROM S TO *S

FOURTH EMBODIMENT THIRD STAGE OF RECOVERY FROM FAILURE

STATION B DETECTS S ON LINE (W)

SWITCH SELECTION FROM LINE (E) TO LINE (W) AND CHANGE FLAG BIT DATA SUPPLIED TO LINE (W) FROM S TO *S

STATION D DETECTS *S ON LINE (E)

FIG. 38 FIFTH EMBODIMENT SECOND STAGE OF OCCURRENCE OF FAILURE

FIFTH EMBODIMENT THIRD STAGE OF OCCURRENCE OF FAILURE

STATION C DETECTS *S ON LINE(W) AND LINE(E)

SWITCH SELECTION FROM LINE(W) TO INT AND REVERSE FLAG BIT DATA SUPPLIED TO LINE(E) FROM S TO *S

FIFTH EMBODIMENT FIRST STAGE OF RECOVERY FROM FAILURE

FAILURE IN EXT ELIMINATED
↓
STATION A DETECTS EXT
↓
SWITCH SELECTION FROM INT TO EXT AND
CHANGE FLAG BIT DATA SUPPLIED TO LINE (W)
AND LINE (E) FROM *S TO S

FIFTH EMBODIMENT SECOND STAGE OF RECOVERY FROM FAILURE

STATION B DETECTS S ON LINE (W)
→ SWITCH SELECTION FROM INT TO LINE (E) AND CHANGE FLAG BIT DATA SUPPLIED TO LINE (E) FROM *S TO S

STATION D DETECTS S ON LINE (W)
→ SWITCH SELECTION FROM INT LINE (W) AND CHANGE FLAG BIT SUPPLIED TO LINE (E) FROM *S TO S

STATION C DETECTS
S ON LINE (E) AND LINE (W)
→ SWITCH SELECTION FROM INT TO LINE (W)

METHOD FOR SYNCHRONIZING SYNCHRONOUS DATA COMMUNICATION NETWORK AND COMMUNICATION DEVICE USED IN THE SYNCHRONOUS DATA COMMUNICATION NETWORK

FIELD OF THE INVENTION

The present invention relates to a synchronous data communication network, and more particularly to a method of switching among a plurality of synchronizing signal sources.

BACKGROUND ART

Recently, as a consequence of a demand for standardization of digital communication networks, many of those networks are synchronous networks, and reliability of a synchronizing signal responsible for synchronization is called for. Known synchronous communication networks include the one using an optical fiber cable for performing transmissions of high-speed digital signals. In such a synchronous communication network, an oscillator for generating a main clock is provided in a system. This main clock is shared by both the transmitting side and the receiving side. Normally, a plurality of input signals, by being subjected to a plurality of times of hierarchical multiplexing processes, are converted into a high-speed multiplexed signals before transmission. The input signals are multiplexed in a byte unit. Upon each multiplexing, signal transmission rate increases.

One of the known high-speed transmission network utilizing byte-multiplexing is SONET (synchronous optical network). As shown in FIG. 1, an STS-1 signal of this SONET system is configured such that one frame is constructed of 6480 bits (=90 bytes× 8 rows×8 bits), where 1 byte represents 8 bits. The duration of one frame is 125 μs, and the bit rate is 51.84 MHz. The frame format of the STS-1 signal shown in FIG. 1 is provided in each channel. The headmost 2 bytes of the frame format are frame synchronizing patterns A1, A2, and the next 1 byte is a channel identification pattern C1. SOH (section overhead), LOH (line overhead), and POH (path overhead) are control data added to the information to be transmitted.

A plurality of STS-1 signals having the above frame format are subjected to a simple byte-multiplexing (meaning that no format conversion is carried out). FIG. 2 shows how three STS-1 signals are byte-multiplexed. The STS-1 signals for three S channels #1, #2 and #3 are byte-multiplexed so that an STS-3 signal having 155.52 MHz rate is generated. This STS-3 signal is standardized as an STM-1 signal according to the CCITT recommendation. It is assumed that an STS-1 signal is transmitted as an optical signal. At the head of the data in the three channels #1-#3, the 2-byte frame synchronizing patterns A1, A2 and the 1-byte channel identification pattern C1 are added. As indicated by broken lines, the STS-3 signal is formed by byte-multiplexing. It is to be noted that no frame patterns unique to the resultant STS-3 signal are inserted. Byte-multiplexing in this system is carried out such that the heads of the signals on the channels #1-#3 are in sync with each other, with the result that the frame-multiplexed synchronizing pattern of an STS-3 signal is of a 6-bit construction.

The frame synchronizing patterns A1, A2 are the same for the channels #1-#3, A1 being "11110110" and A2 being "00101000". The channel identification patterns C1 for the channels #1-#3 are set to be different from channel to channel.

Referring back to FIG. 1, B1-B3 are byte interleave parities; C2 is a signal label byte indicative of the presence or absence of information; D1-D12 are data communication bytes for transporting, for example, information relating to the state of different units; E1, E2 are order wire bytes; F1, F2 are user channel bytes; G1 is a path status byte for detecting a parity error of an input signal and returning the detected error to the originating unit; H1, H2 are pointers having a stuffing function for incorporating an asynchronous system; H3 is a pointer having a variable slot function in stuffing; H4 is a multi-frame indication byte; J1 is a trace byte; K1, K2 are automatic protection switch bytes; and Z1-Z5 are reserved bytes.

At the receiving side, frame synchronization is effected by detecting the 6-byte frame multiplexed synchronizing pattern of the STS-3 signal as shown in FIG. 2. As indicated by the broken lines, the signal is divided into the data for each of the channels #1-#3, whereupon the channel identification pattern C1 is utilized to determine whether the accurate separation is achieved.

It is possible to further multiplex the STS-1 signal. In a manner similar to the above, the frame synchronizing patterns A1, A2 and the channel identification pattern C1 at the head of the STS-1 signal are byte multiplexed and provided at the head of the STS-n signal obtained as a result of n-multiplexing. The frame multiplexed synchronizing patterns provided at the head of the STS-n signal is of a 2 n byte construction.

As has been described, the conventional synchronizing data communication network allows only one synchronizing signal source in the network and is merely capable of informing to the outside that a failure has occurred and the timing fails to be maintained. Accordingly, data communication is disabled when a failure occurs and prevents the timing to be maintained.

DISCLOSURE OF THE INVENTION

An object of the present invention is to eliminate the above disadvantage.

More specifically, an object of the present invention is to provide a synchronizing method of a synchronous data communication network in which a plurality of synchronizing signal sources are provided in a data communication network and data communication is maintained upon an occurrence of a failure by efficiently switching among the synchronizing signal sources in response to the failure that occurred, as well as to provide a communication apparatus used in such a synchronous data communication network.

The object of the present invention can be achieved by a method of switching from one synchronizing signal source to another in a synchronous data communication network comprising: a plurality of stations connected to each other via lines; and a plurality of synchronizing signal sources provided inside or outside the stations, the method comprising steps of: (a) setting, in a signal transmitted via the line and including the synchronizing signal, flag bit data (S, *S) indicating whether or not the synchronizing signal transmitted via the lines is available; (b) allowing each station to refer, on the basis of the flag bit data, to a table provided in each station and specifying the order of priority for selection of a synchronizing signal source, upon occurrence of a failure in any of the plurality of synchronizing signal sources, and selecting a synchronizing signal source; and (c) allowing each station to switch from the currently selected synchronizing signal source to the synchronizing signal source selected in the step (b).

The object of the present invention can also be achieved by a communication apparatus used in a synchronous data communication network having a plurality of signal sources, the apparatus comprising: first means for receiving flag bit data (S, *S) indicating whether or not a synchronizing signal transmitted via a line is available, which synchronizing signal is included in the signal transmitted via the lines; second means for specifying the order of priority for selection of a synchronizing signal source; third means for referring, upon occurrence of a failure in any of the plurality of synchronizing signal sources, to the order of priority for selection of a synchronizing signal source, which order is specified by the second means, and for selecting, on the basis of the flag bit data, a synchronizing signal source; and fourth means for sending, in correspondence to the synchronizing signal source selected by the third means, a flag bit data, indicating whether or not the synchronizing signal from the communication apparatus originating the flag bit is available, to a neighboring communication apparatus.

BEST MODE OF CARRYING OUT THE INVENTION

Figure 1:
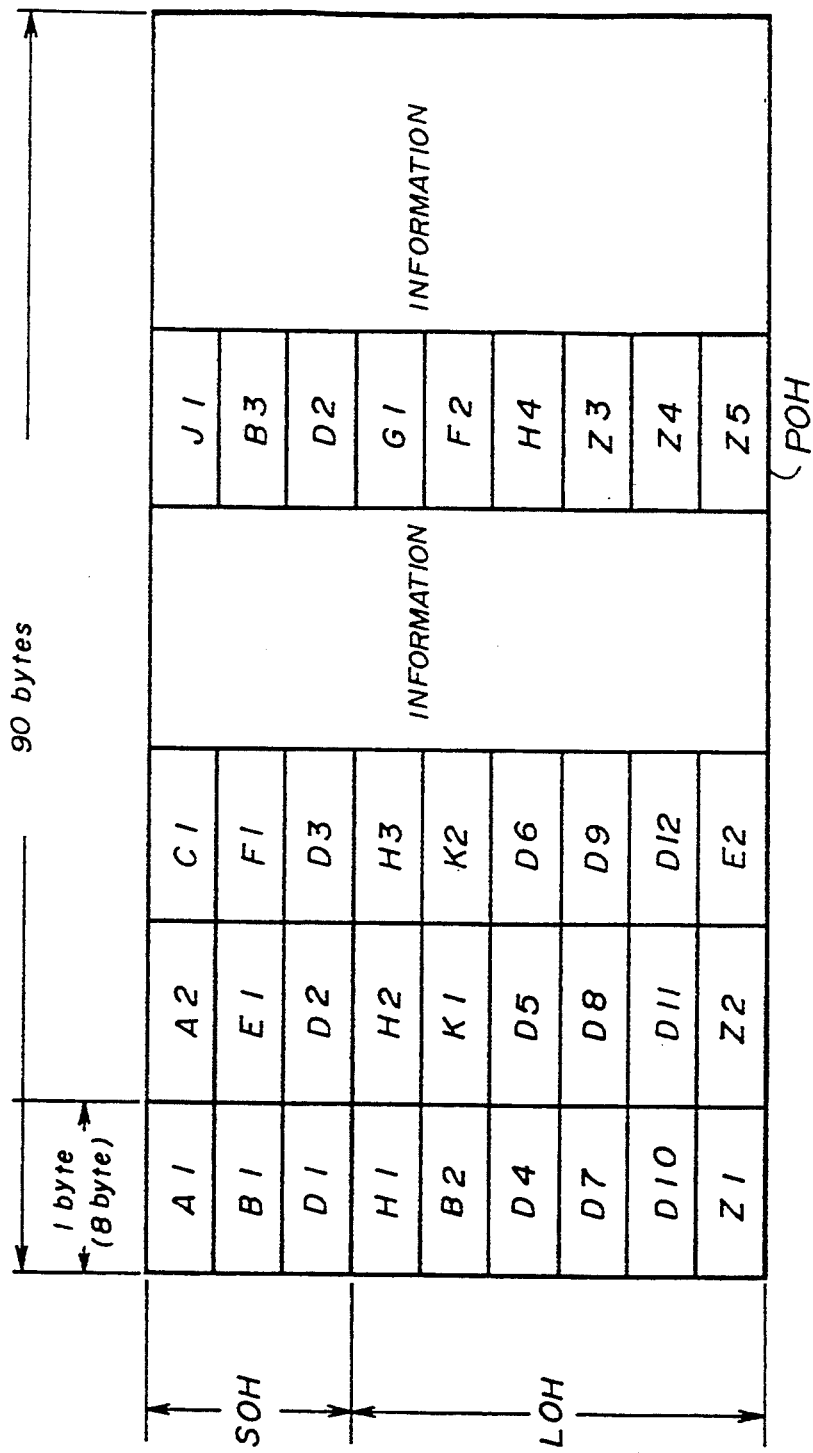
FIG. 1 is a block diagram illustrating an example of a synchronous data communication network.
Figure 2:
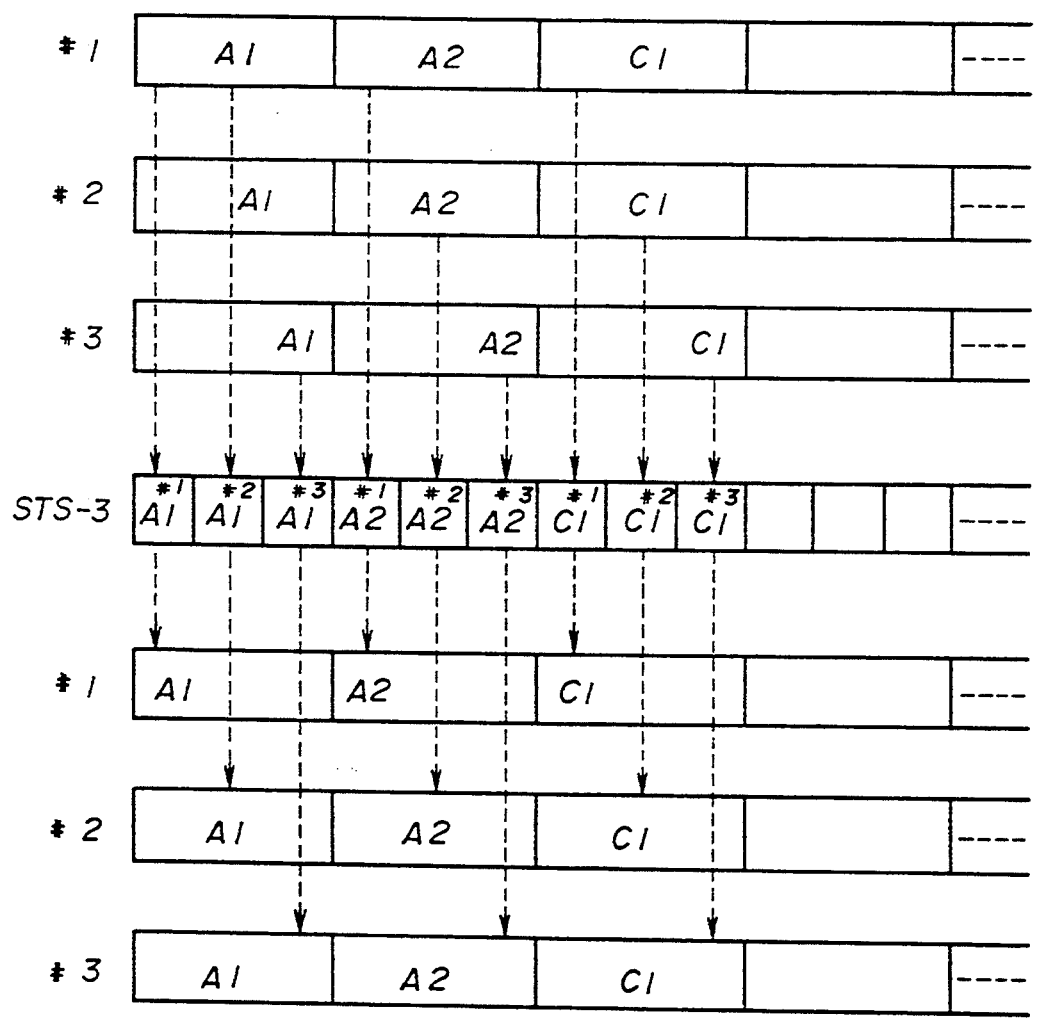
FIG. 2 illustrates a signal multiplexing operation in the synchronous data communication network shown in FIG. 1.

The synchronizing signal source switching method of the present invention, as applied to a digital communication network having a plurality of stations A, B, C, and D connected via lines and comprising a plurality of synchronizing signal sources, allows the following data to be set in an overhead bit of a signal transmitted to the stations, i.e.: a synchronizing bit data, by which a synchronizing signal is transmitted; and flag bit data S, *S indicating whether or not the synchronizing signal is included in the transmitted signal and is available. Additionally, the stations are provided with tables T-A, T-B, T-C and T-D specifying the order of priority for selection of a synchronizing signal source in the stations. The order of priority is such that, for a parent station A using an external synchronizing signal source during a normal operation, the external synchronizing signal source is given the highest order, while an internal signal source is given the lowest order; and, for a parent station using an internal synchronizing signal source INT during a normal operation, the internal synchronizing signal source INT is given the highest order. As regards child stations B, C and D receiving the synchronizing signal from other stations, the station from which they receive the signal during a normal operation is given the highest order, followed by the station from which they receive the synchronizing signal when a failure occurs. In the case that the child station has an internal synchronizing signal source INT, the internal synchronizing signal source INT is given the lowest order. The synchronizing signal sources in the network include a plurality of external synchronizing signal sources EXT and the internal synchronizing signal sources INT provided in the stations. The stations in this communication network may be in a linear mode arrangement, a ring mode arrangement or in an arrangement which is a combination of these two modes of arrangement.

The present invention allows the parent station A to send, during a normal operation, a flag bit data S, indicating that the synchronizing signal thereof is available, to all of its neighboring stations, and to send, when there is a failure in the synchronizing signal source, a flag bit data *S indicating that the same signal is not available. When the flag bit data from any of the neighboring stations indicate the availability of the synchronizing signal source, the child stations B, C, D selects, from among the neighboring stations having their flag bit data indicating that their synchronizing signal is available, a station to receive the synchronizing signal from, the selection being based on the order of priority specified in the table. The child stations then sends the flag bit data, indicating that the synchronizing signal therefrom is not available, to the selected station, while at the same time sending the flag bit data, indicating that the same signal is available, to the other station connected thereto. When the flag bit data from a neighboring station connected to the child station indicates non-availability of the synchronizing signal source, such a neighboring station having its flag bit data indicating non-availability is neglected in the process of selection based on the order of priority. A child station operated by using the internal synchronizing signal source INT sends the flag bit data indicating non-availability to the neighboring stations.

Both during the normal operation and when a failure occurs, each station checks the flag bit data of the synchronizing signal sources constantly searching for a source having higher priority. Specifically, the stations successively carry out, in a manner resembling a chain reaction, a process of selecting a synchronizing signal source in accordance with the above-described procedure which involves a process of referring to the specified order of priority, and then changing, on the basis of that selection, the transmitted flag bit data. When the failure is removed, the same chanin reaction of selecting and changing is successively carried out by the stations in accordance with the procedure already mentioned, until the normal state is regained. While the internal synchronizing signal source in the child station may be temporarily employed while the above process is successively carried out following an occurrence of a failure, the stations are finally put in synchronous operation using one or two synchronizing signal sources. The same thing applies to a process of recovering from a failure.

The internal synchronizing signal sources of the stations, which sources are employed temporarily, are in a stand-by status by maintaining its synchronousness with the synchronous signal in the communication network. Since the switching, from a synchronizing signal source external to the station to the internal synchronizing signal source, is conducted in an extremely short time, the phase shift of the synchronizing signals thereof can be neglected, thus enabling a high-precision high-reliability synchronizing signal switching.

A synchronizing bit data for transmitting the synchronizing signal and a flag bit data indicating availability/non-availability of the synchronizing signal are provided in a predetermined position of the overhead of the signal transmitted through the stations in the digital communication network of the present invention. For example, the aforementioned reserved byte Z1 may be used. In the embodiments that follow, S signifies a bit data indicating availability of a synchronizing signal source, and *S signifies a bit data indicating non-availability.

A detailed description will be given below of the first embodiment of the present invention, in which the stations A through D are serially arranged, that is, are in a linear mode arrangement, and two external signal sources EXT (P) and EXT (S) are connected to the stations A and D at both ends of the series, respectively. The first external synchronizing signal source EXT (P) is connected to the station A as a main signal source. Accordingly, the station A will be called a parent station. The second external synchronizing signal source EXT (S) is connected to the station D as a reserved signal source. Symbols E and W denote directions, E signifying the right hand side and W signifying the left hand side. Referring to the figures, a solid line signifies a flow of a synchronizing signal and a flag bit data, and a broken line signifies a flow of a flag bit data as it is processed in each station according to the rule specified below. Squares T-A, T-B, T-C and T-D are tables showing the order of priority preset in each station for selection of one of the synchronizing signal sources. The source entered at the top of the table is given the highest priority. Therefore, the synchronizing signal source used during a normal operation is given the highest order, followed by the source in the neighboring station which source should be selected when a failure occurs. If the station has an internal synchronizing signal source INT, it is given the lowest order. In the tables, a solid black circle signifies the currently used signal source, an X signifies that the signal source is not available even if it is requested, and a Circle signifies that the source is available at that moment.

Figure 3:
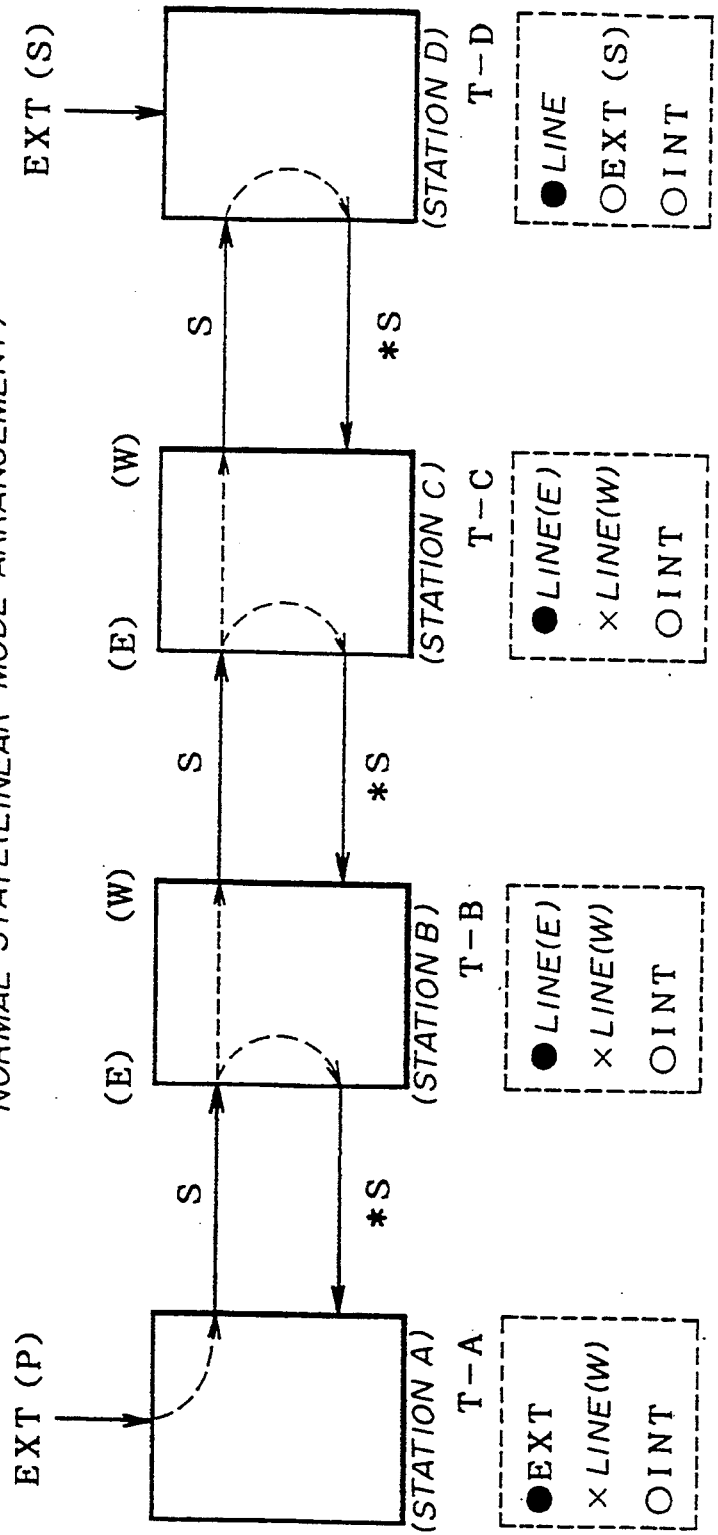
FIG. 3 illustrates a normal operation of the first embodiment of the present invention.
Figure 4:
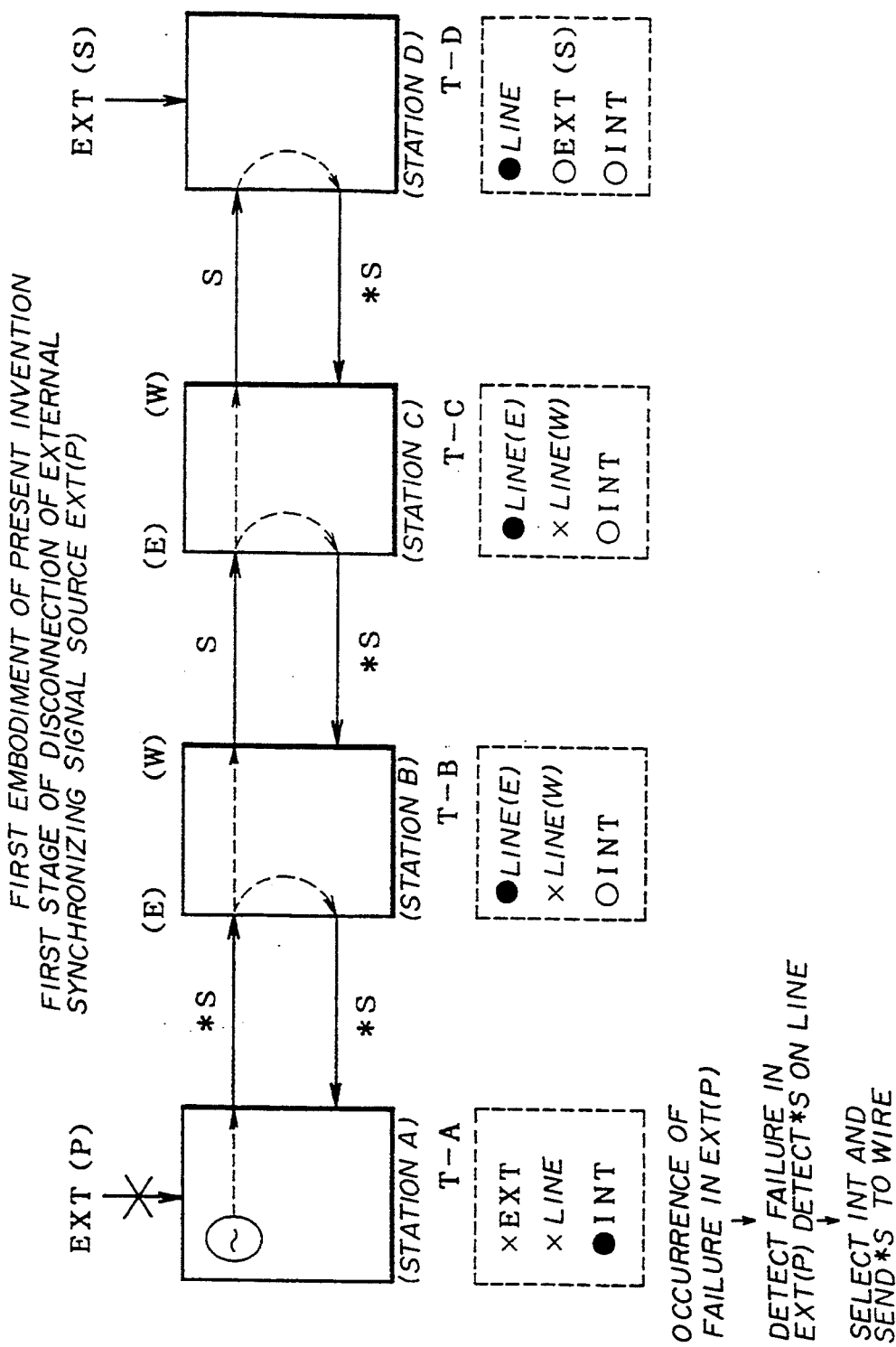
FIG. 4 illustrates the first stage of a failure occurring in the first embodiment of the present invention.

FIG. 3 shows a normal operation. A description will be given below of a procedure by which the synchronizing signal transmission channel for each station is switched when the first external synchronizing signal source EXT (P) is disconnected. FIG. 4 illustrates the first stage of a failure. The station A detects the disconnection of the external synchronizing signal source EXT (P) and checks the table T-A to see if the line connected to the station A and given the next highest order, that is, the station B in this case, is available. Since, however, the flag bit data supplied to that line is *S indicating non-availability, the internal synchronizing signal source INT, having the next highest order of priority is selected. At the same time as this, the flag bit data S, which indicates the availability of the synchronous signal and had been sent to the line connected to the station B, is changed to the flag bit data *S.

Figure 5:
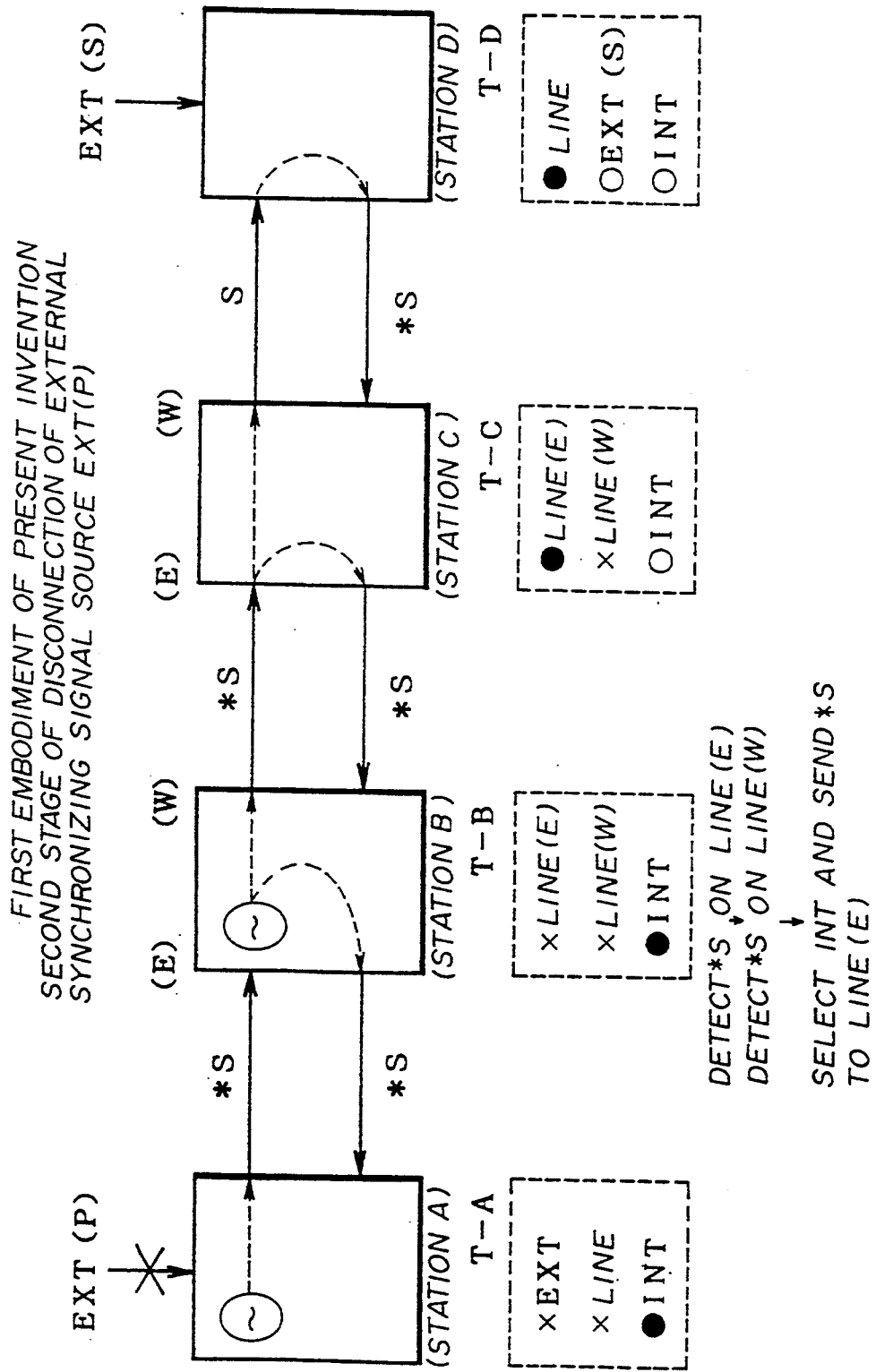
FIG. 5 illustrates the second stage of a failure occurring in the first embodiment of the present invention.

FIG. 5 illustrates the second stage of a failure that follows the stage shown in FIG. 4. The station B, which has received the flag bit data *S from the adjacent station A to the E direction, refers to the order of priority specified in the table T-B and checks the station C to the W direction. Since, however, the flag bit data *S is detected again, the station B selects the internal synchronizing signal source INT and changes the flag bit data supplied to the station C, from S to *S.

Figure 6:
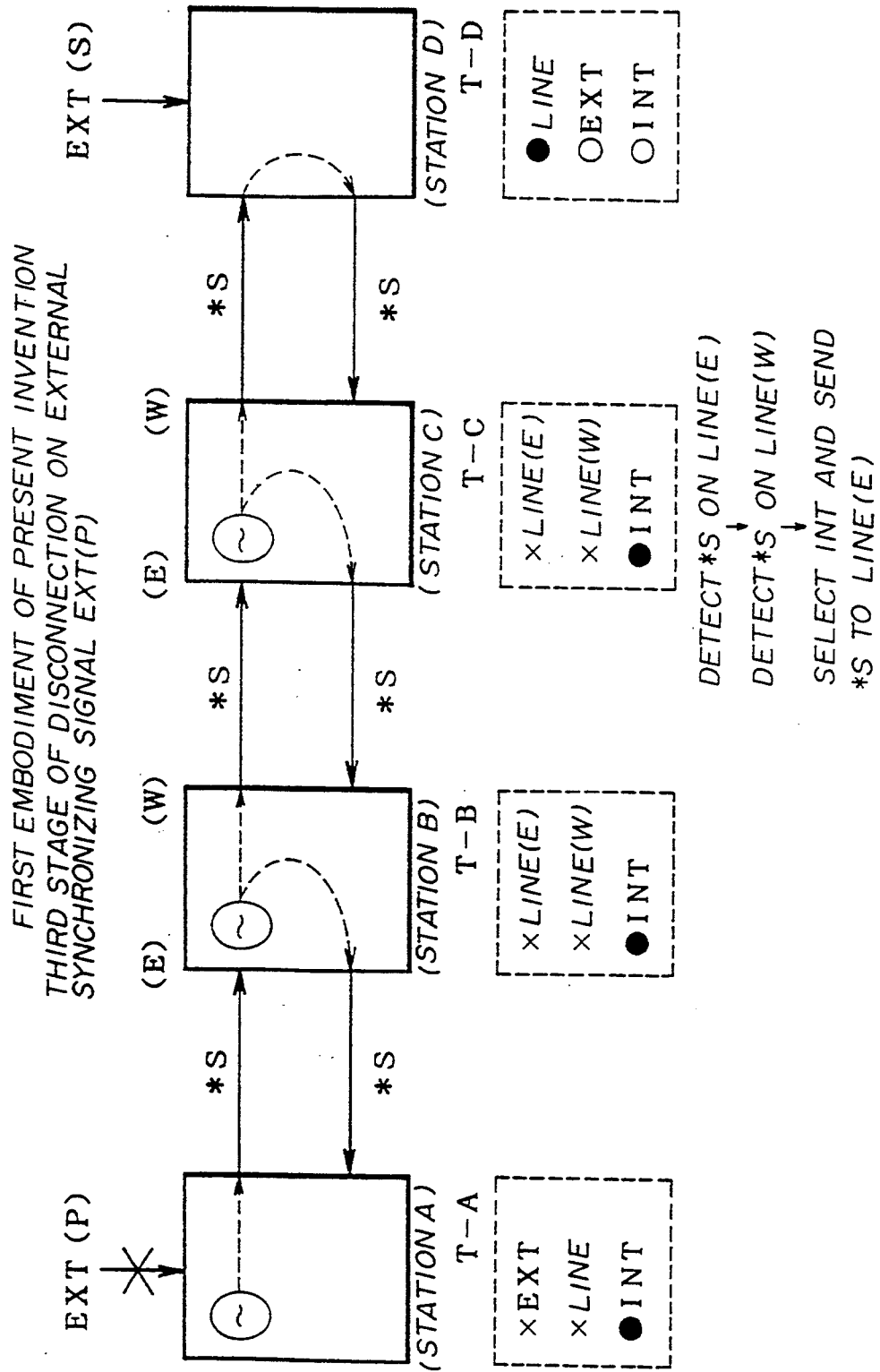
FIG. 6 illustrates the third stage of a failure occurring in the first embodiment of the present invention.

FIG. 6 illustrates the third stage that follows the stage shown in FIG. 5. The station C selects the internal synchronizing signal source by following steps similar to the ones taken by the station B at the second stage described above, while at the same time changing the flag bit data supplied to the station D, from S to *S.

Figure 7:
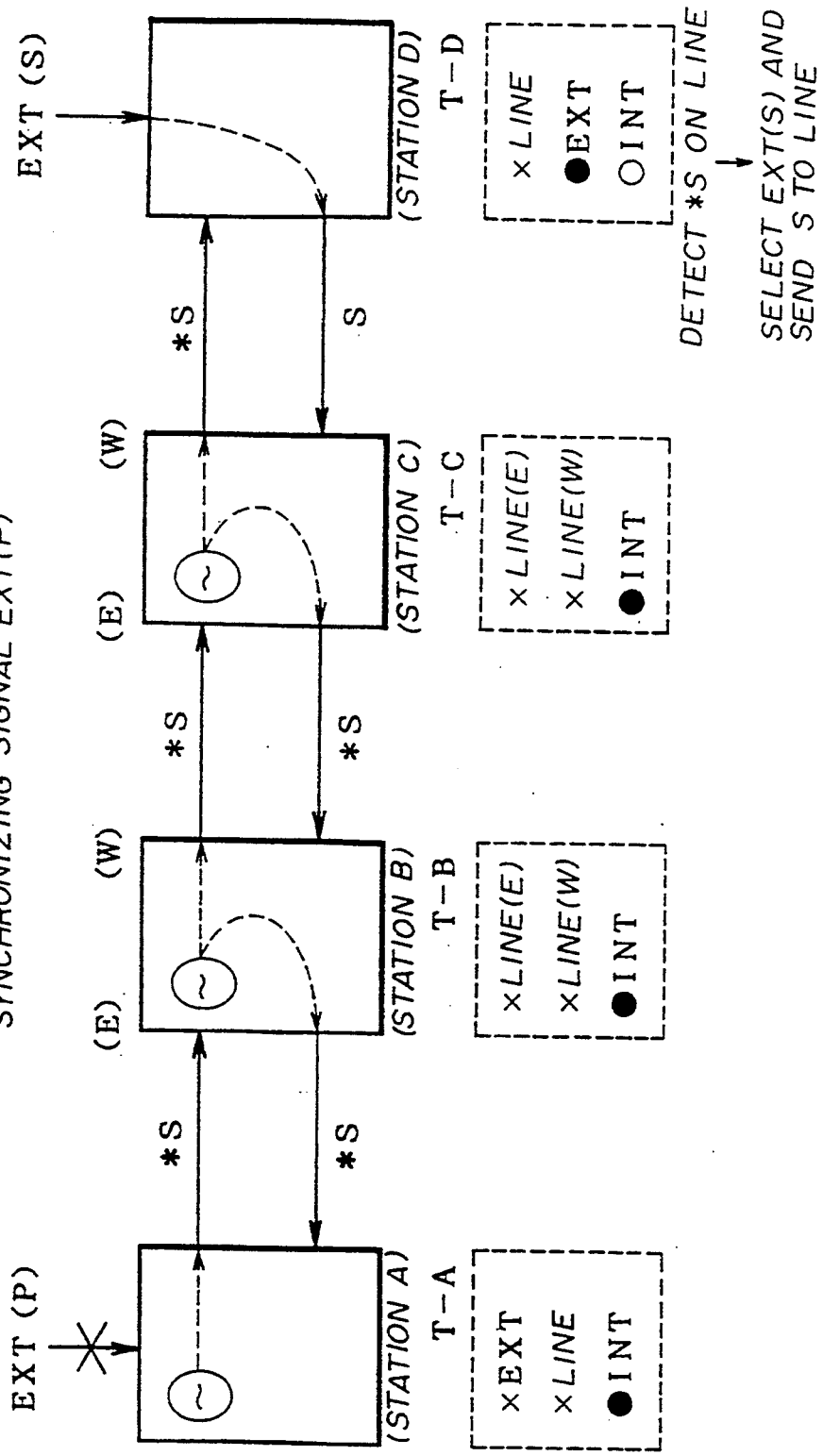
FIG. 7 illustrates the fourth stage of a failure occurring in the first embodiment of the present invention.

FIG. 7 illustrates the fourth stage that follows the stage shown in FIG. 6. The station D detects *S on the line connected to the station C, selects the second external synchronizing signal source EXT (S) having the next highest priority according to the table T-D, while at the same time changing the flag bit data supplied to the line connected to the station c, from *S to S.

Figure 8:
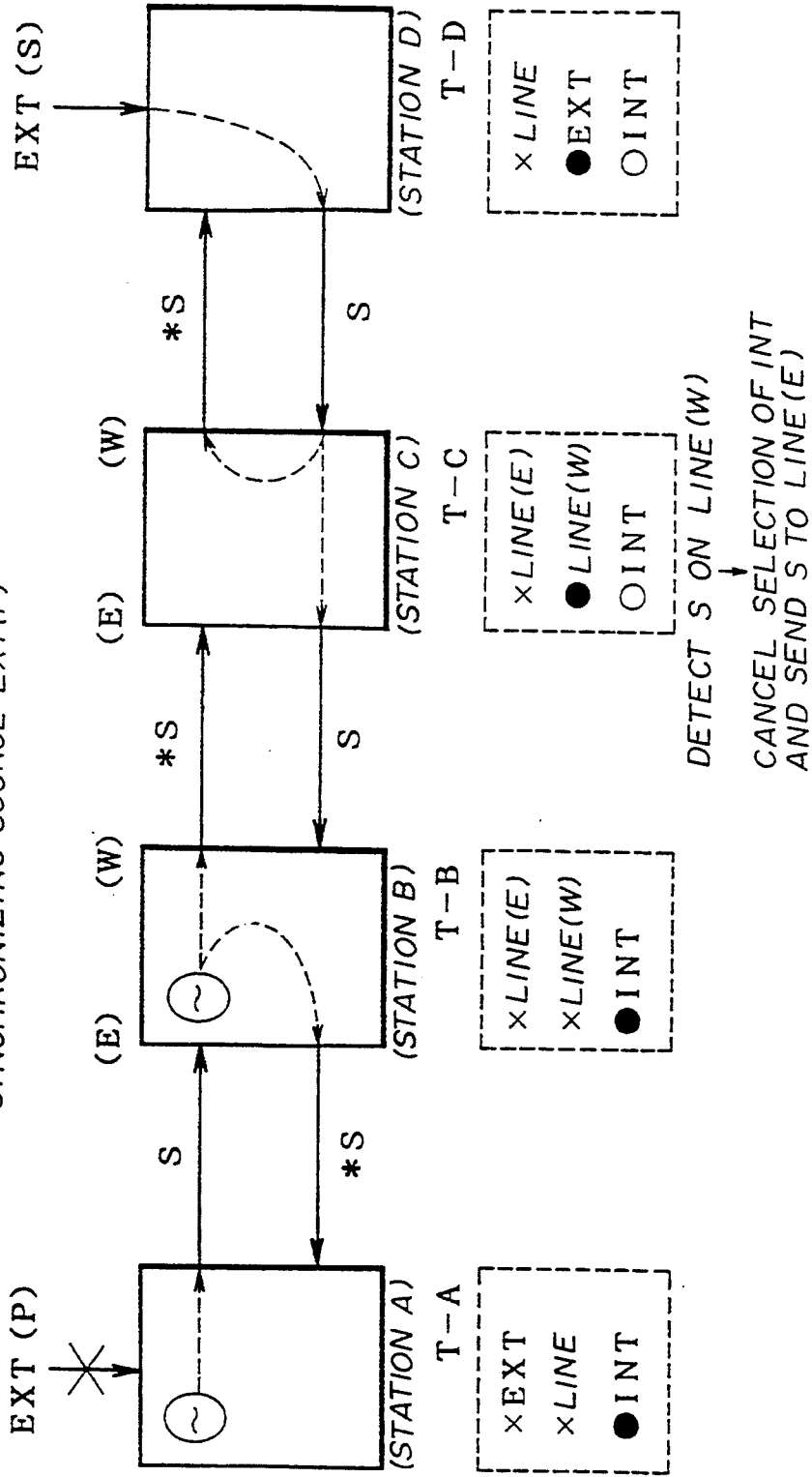
FIG. 8 illustrates the fifth stage of a failure occurring in the first embodiment of the present invention.

FIG. 8 illustrates the fifth stage that follows the stage shown in FIG. 7. The station C, which checks the state of the synchronizing signal sources constantly searching for a source having higher priority, checks, in accordance with the order of priority specified in the table T-C, the line to the E direction and detects *S. The station C then checks the line connected to the station D to the W direction, which line has the next highest priority, and, finding that S is sent therefrom, changes the flag bit data supplied to the line connected to the station B, from *S to S.

Figure 9:
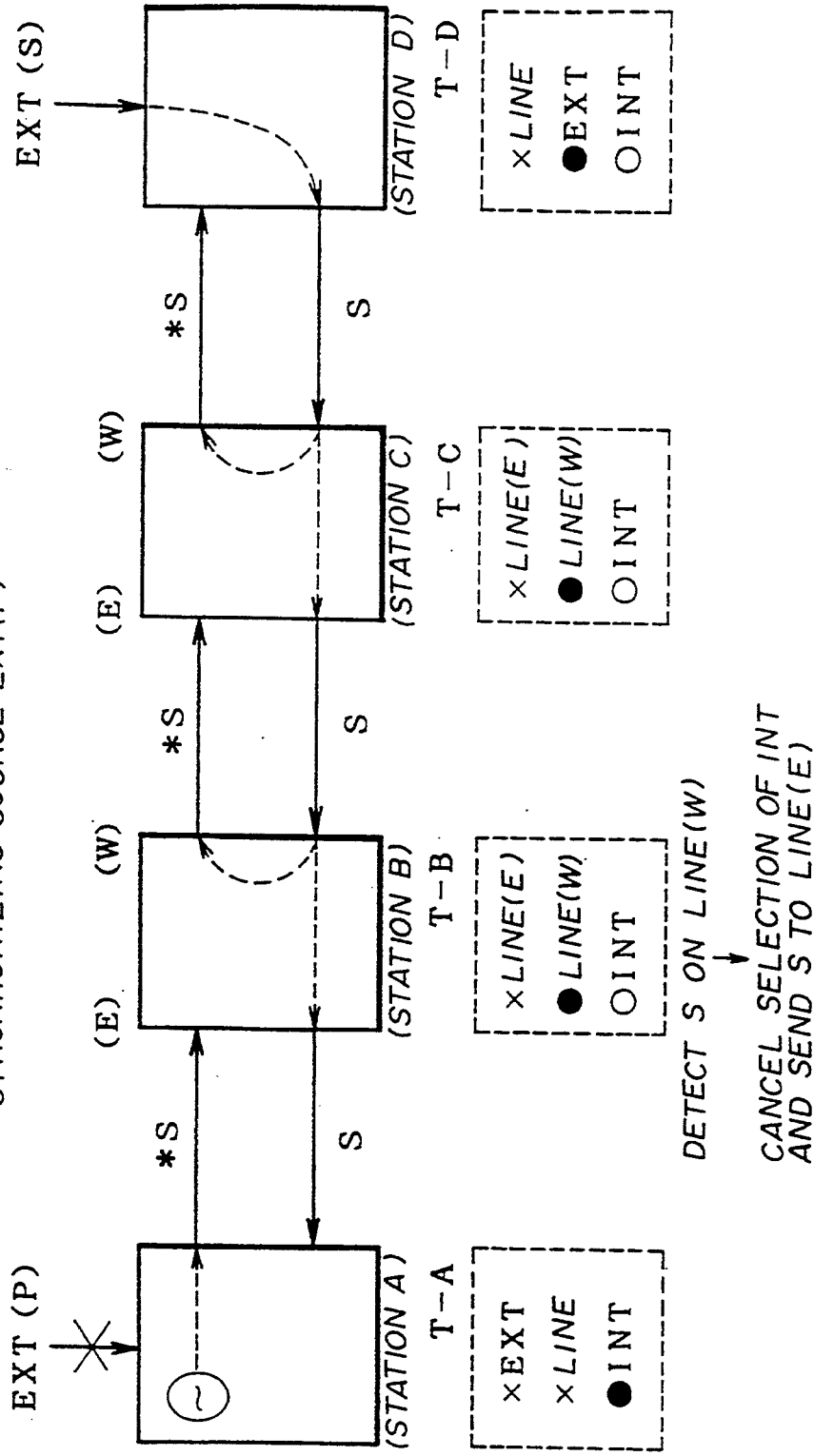
FIG. 9 illustrates the sixth stage of a failure occurring in the first embodiment of the present invention.
Figure 10:
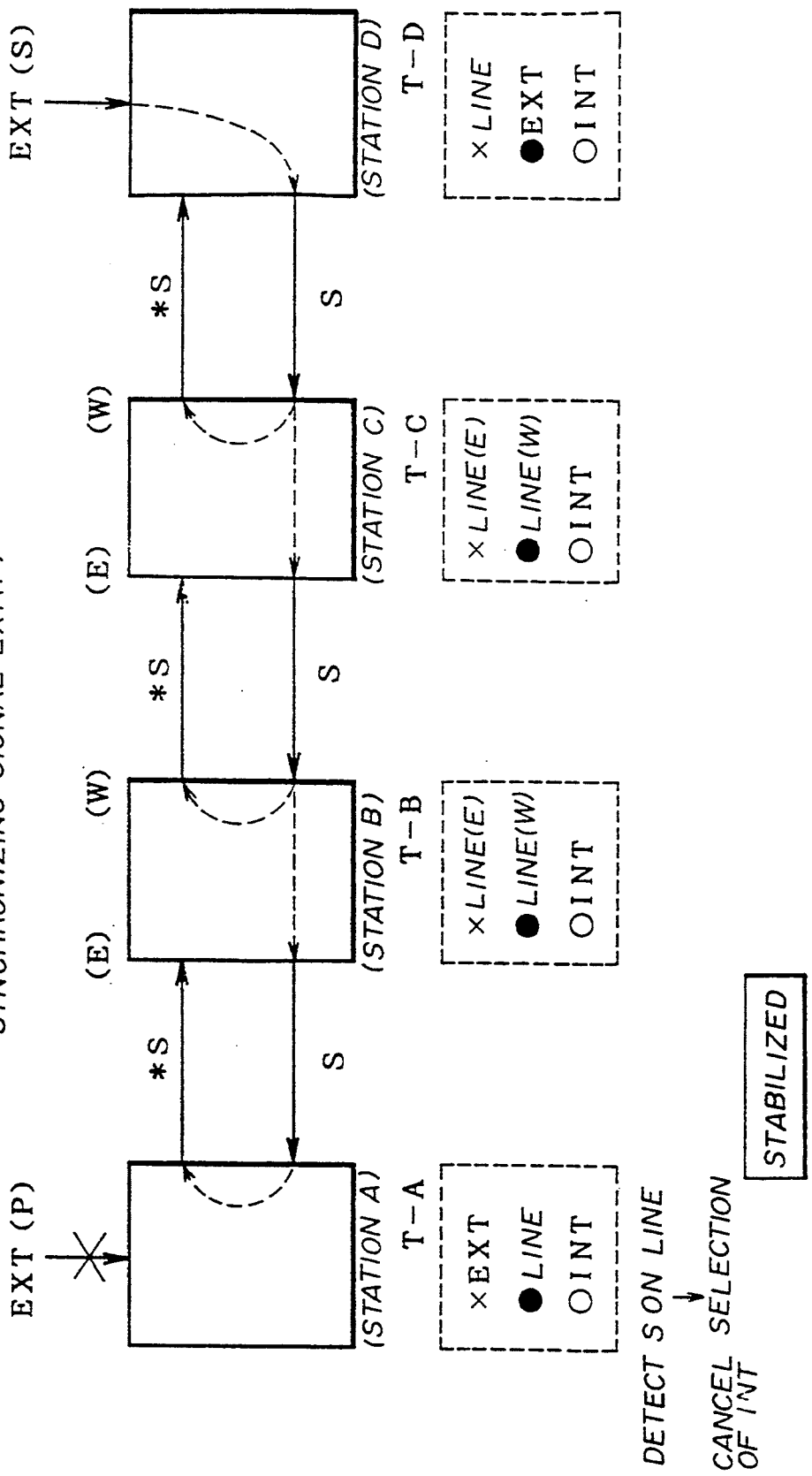
FIG. 10 illustrates the seventh stage of a failure occurring in the first embodiment of the present invention.

FIG. 10 illustrates the seventh stage that follows the stage shown in FIG. 9. The station A detects S on the line connected to the station B, which line is then selected, while at the same cancels the use of the internal synchronizing signal source INT having lower priority than the station B. A stable state now being attained, all of the stations operate in sync with the second external synchronizing signal source EXT (S).

A description will be given below of the procedure for switching, when the system recovers from the failure in the first external synchronizing signal source EXT (P), the channel on which the synchronizing signal is transmitted to each station.

Figure 11:
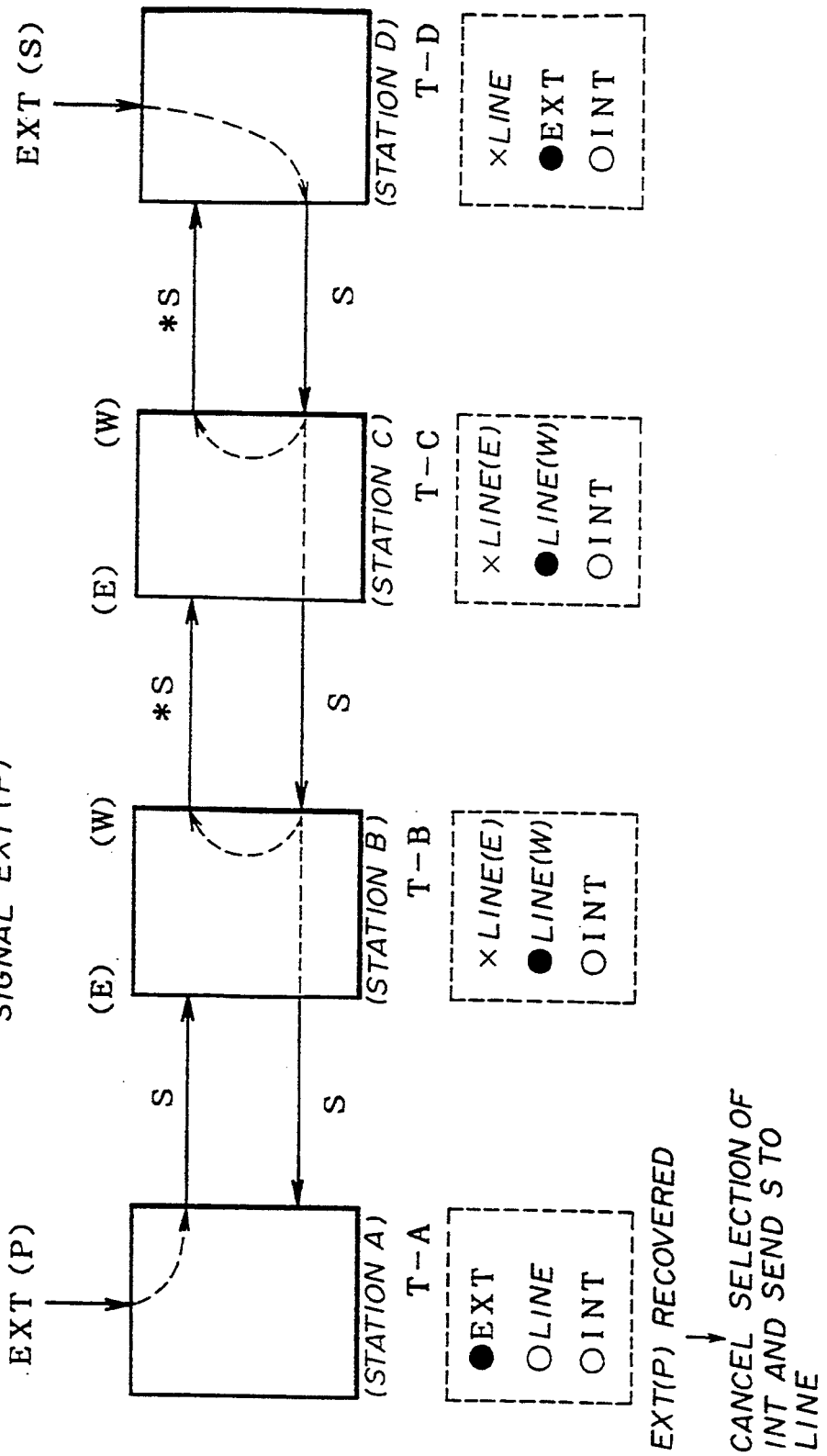
FIG. 11 illustrates the first stage of a recovery in the first embodiment of the present invention.

FIG. 11 illustrates the first stage of a recovery. The station A detects the synchronizing signal from the first external synchronizing signal source EXT (P) and cancel the selection of the synchronizing signal from the station B having lower priority than the external source EXT (P) according to the table T-A, while at the same time changing the flag bit data supplied to the station B, from *S to S.

Figure 12:
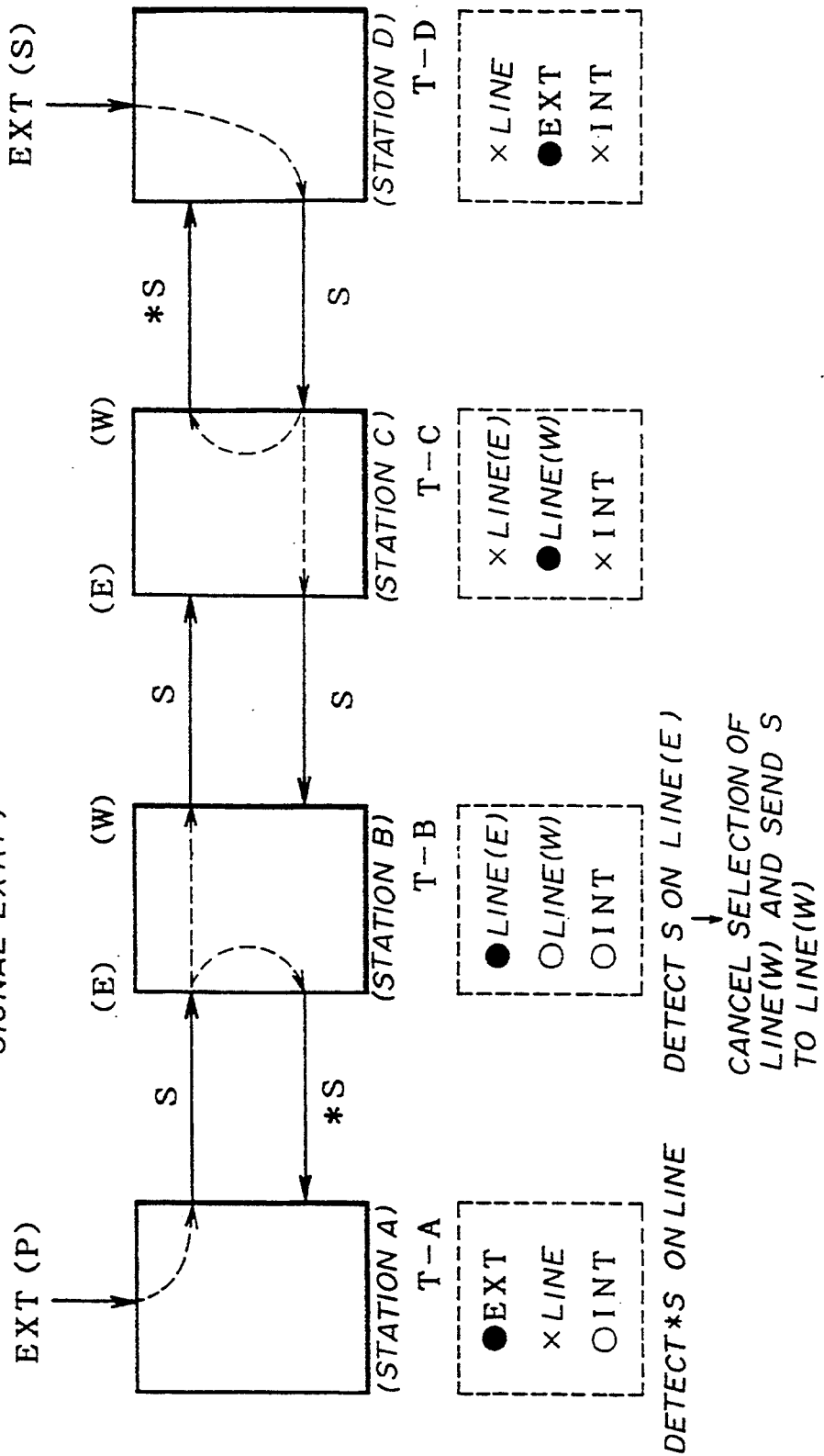
FIG. 12 illustrates the second stage of a recovery in the first embodiment of the present invention.

FIG. 12 illustrates the second stage of a recovery that follows the stage shown in FIG. 11. The station B detects S in a transmission via the line connected to the station A, which line is then selected, and cancels the selection of the synchronizing signal from the station C because the line connected thereto has lower priority than that connected to the station A, while at the same time changing the flag bit data supplied to the station C, from *S to S.

Figure 13:
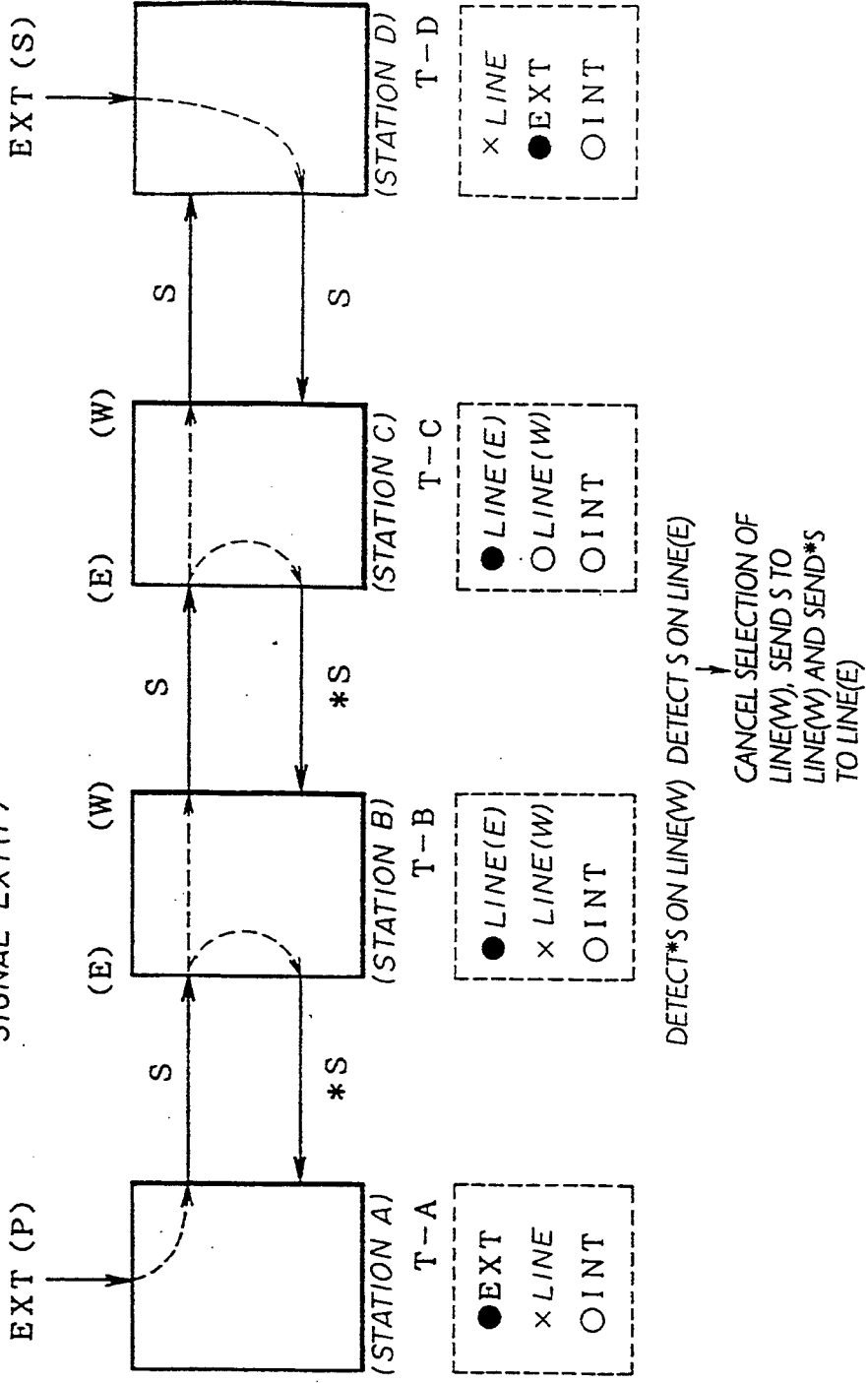
FIG. 13 illustrates the third stage of a recovery in the first embodiment of the present invention.

FIG. 13 illustrates the third stage of a recovery that follows the stage shown in FIG. 12. The station C follows the same steps as those followed by the station B in the second stage of a recovery, selects the line connected to the station B after detecting S in that line, and cancels the selection of the synchronizing signal from the station D because the line connected thereto has lower priority than that connected to the station B, while at the same time changing the flag bit data supplied to the station D, from *S to S.

Figure 14:
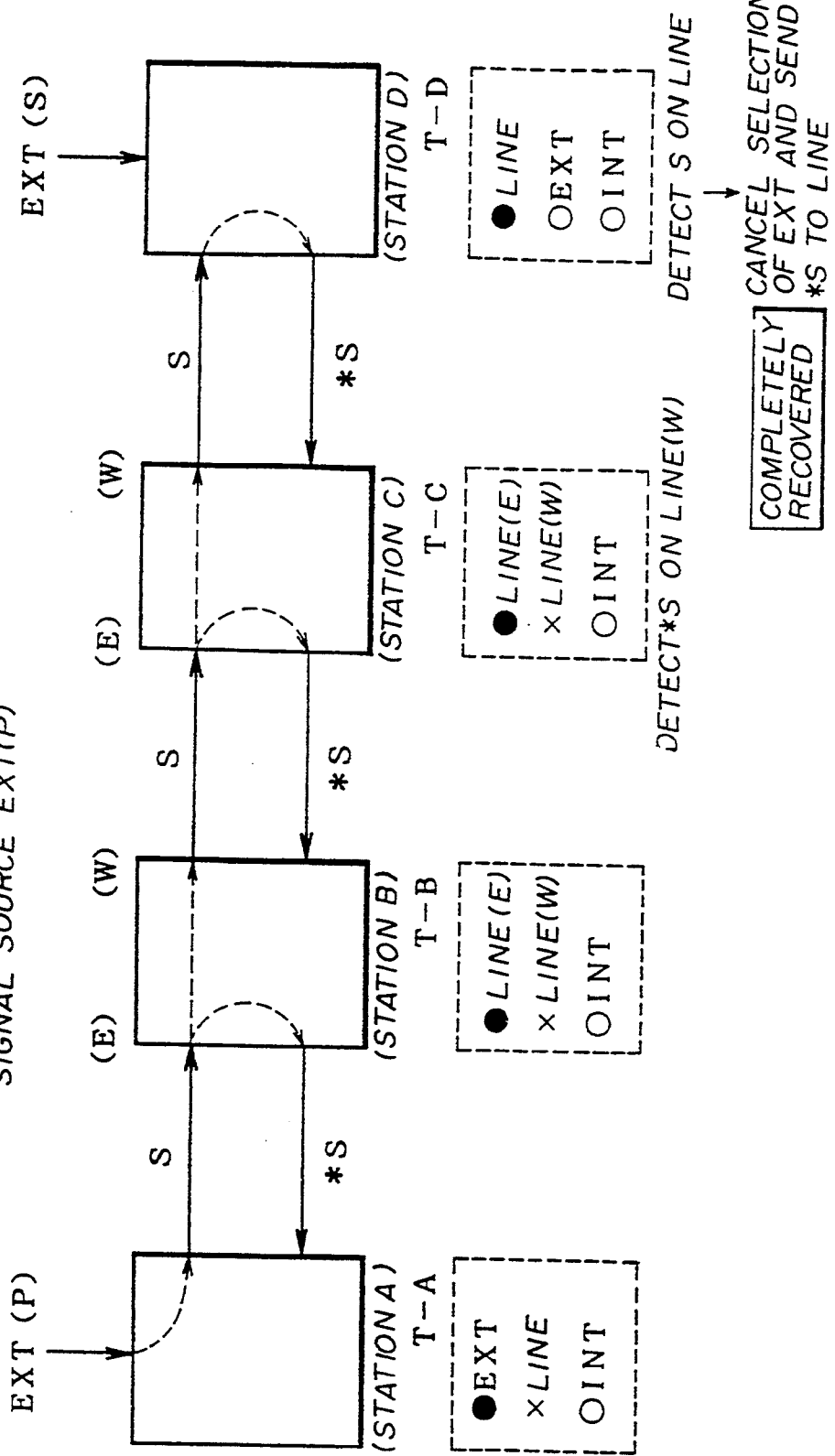
FIG. 14 illustrates the fourth stage of a recovery in the first embodiment of the present invention.

FIG. 14 illustrates the fourth stage of recovery that follows the stage shown in FIG. 13. The station D detects S on the line connected to the station C, which line is then selected, and cancels the selection of the external synchronizing signal having lower priority than the station C, while at the same time changing the flag bit data supplied to the station C, from *S to S. This way, the normal state shown in FIG. 3 is regained.

Figure 15:
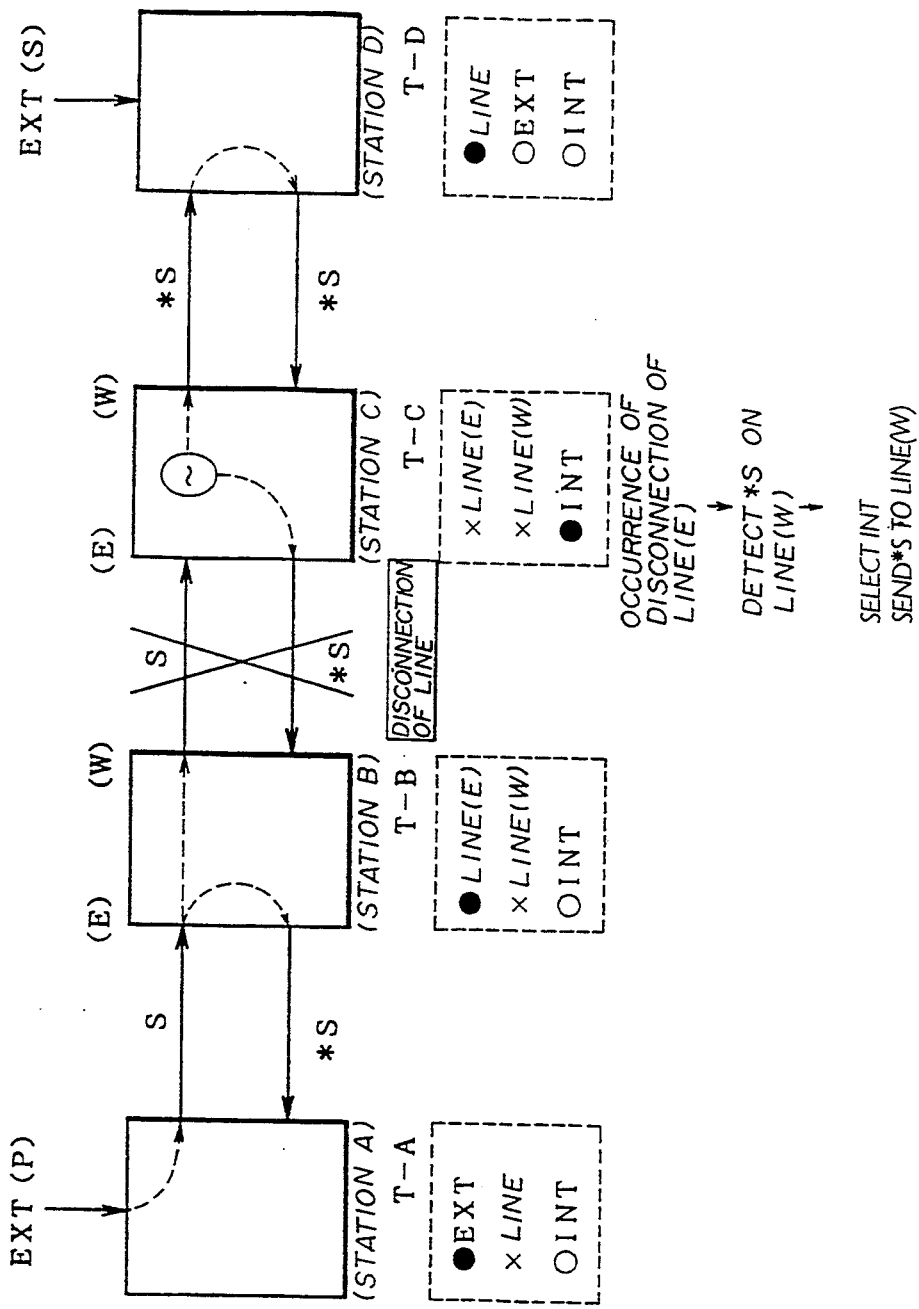
FIG. 15 illustrates the first stage of a failure occurring in the second embodiment of the present invention.

A description will next be given of the second embodiment in which a failure in the transmission circuit is assumed to occur between the station B and the station C under the same configuration as in the first embodiment, with reference to FIGS. 15 through 19. FIG. 15 illustrates the first stage of a failure where the station B and the station C are disconnected. The station C, which had received the synchronizing signal from the station B, now detects an absence of the flag bit data S in the received signal, checks the line to the W direction, which line has the next highest priority according to the table T-C. Since, however, the flag bit data supplied to the line is *S indicating non-availability of the synchronizing signal, the internal synchronizing signal source INT having the next highest priority is selected, while at the same time the flag bit data that had been transmitted to the line connected to the station D is changed from S to *S.

Figure 16:
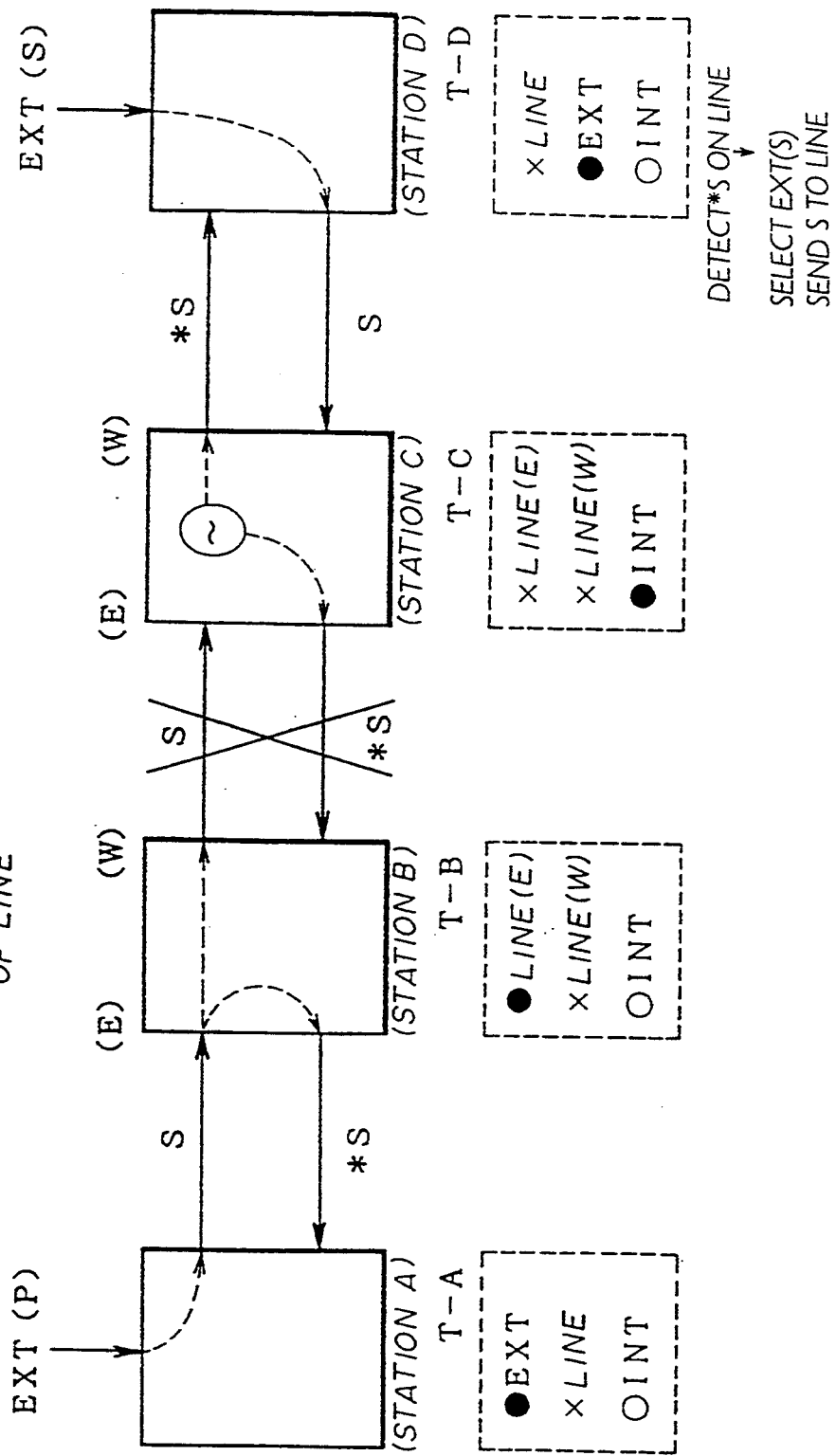
FIG. 16 illustrates the second stage of a failure occurring in the second embodiment of the present invention.

FIG. 16 illustrates the second stage that follows the stage shown in FIG. 15. The station D detects *S in a transmission via the line connected to the station C and selects the second external synchronizing signal source EXT (S) having the next highest priority according to the table T-D, while at the same time changing the flag bit data supplied to the line connected to the station C, from *S to S.

Figure 17:
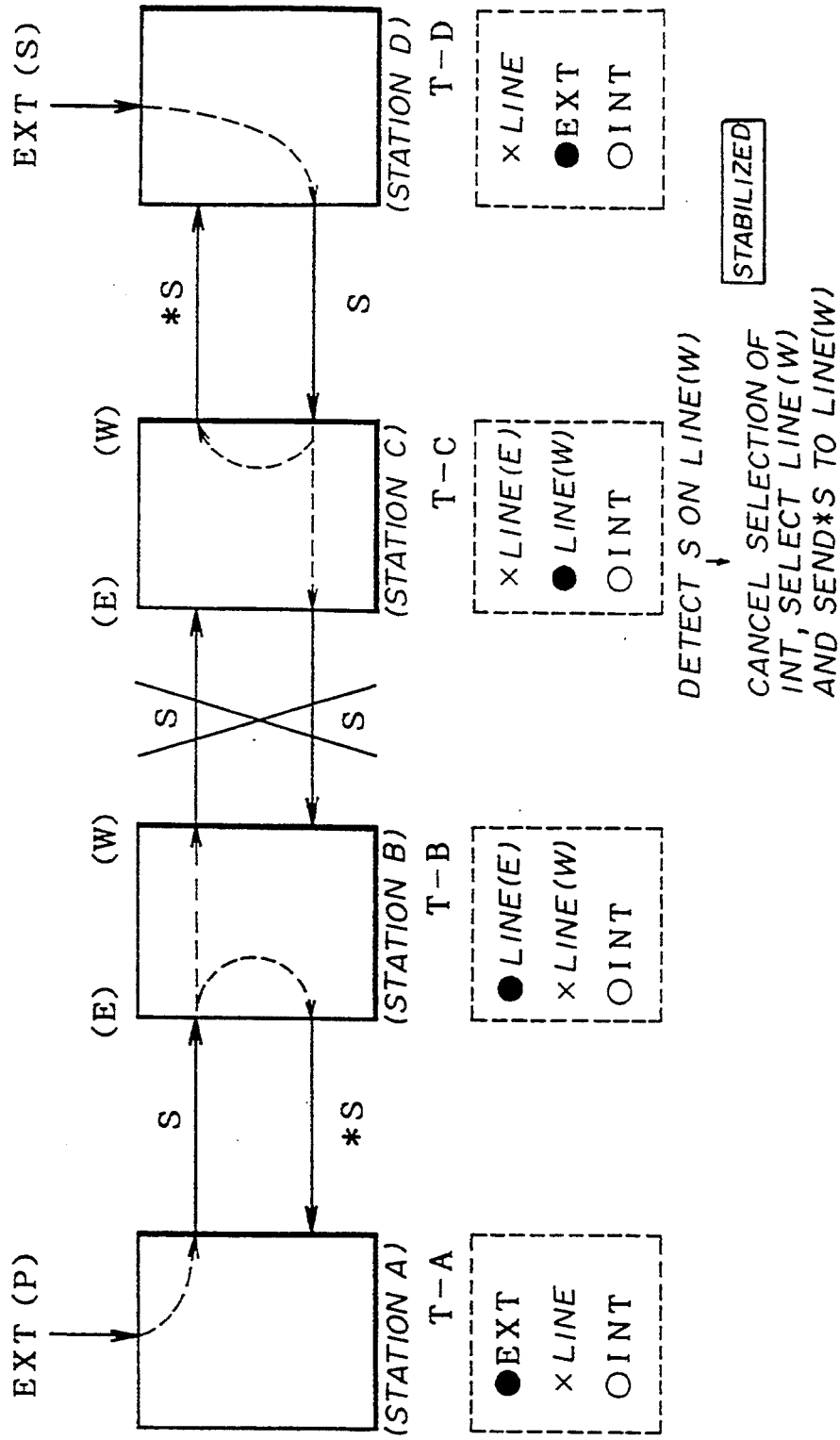
FIG. 17 illustrates the third stage of a failure occurring in the second embodiment of the present invention.

FIG. 17 illustrates the third stage that follows the stage shown in FIG. 16. The station C, which checks the state of the synchronizing signal sources constantly searching for a source having higher priority, detects S on the line connected to the station D to the W direction, which line has higher priority than the internal synchronizing signal source INT according to the table T-C. The station C then selects the line connected to the station D, while at the same time changing the flag bit data supplied to the line connected to the station B, from *S to S. This changing of the flag bit data is carried out merely by way of observing the rule, and the flag S does not actually reach the station B. A stable state thus being attained, the first external synchronizing signal source EXT (P) temporarily holds the station A and the station B, that is the stations to the E direction as viewed from the point of occurrence of a failure. The second external synchronizing signal source EXT (S) holds the stations C and D, that is, the stations to the W direction, in sync with each other.

A description will next be given of the procedure for recovering, when the failure is removed, the channel for transmitting the synchronizing signal to the stations.

Figure 18:
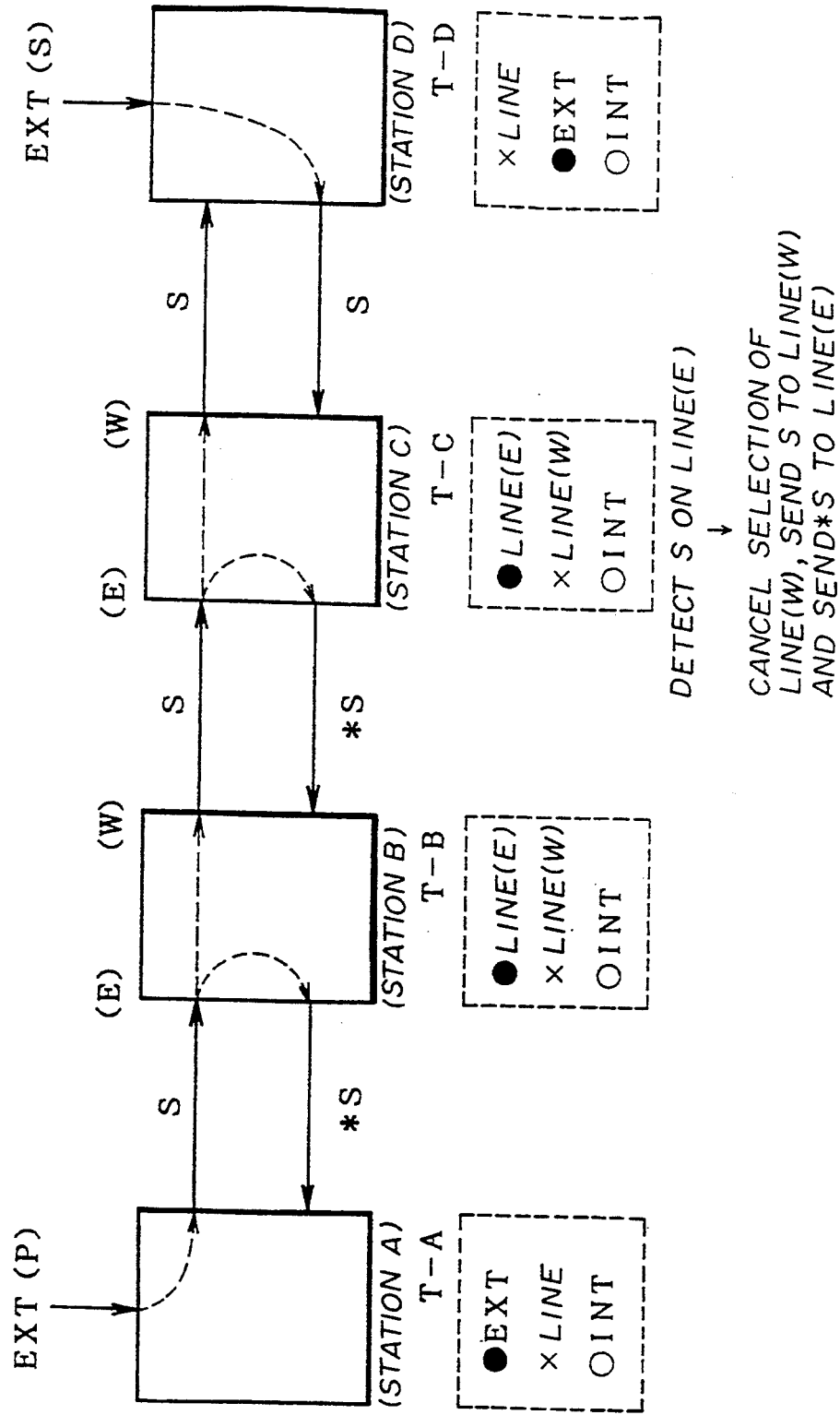
FIG. 18 illustrates the first stage of a recovery in the second embodiment of the present invention.

FIG. 18 illustrates the first stage of a recovery. The station C detects S on the line connected to the station B, selects the same station in accordance with the table T-C, and cancels the selection of the synchronizing signal from the station D because the line connected thereto has lower priority than the line connected to the station B, while at the same time changing the flag bit data supplied to the station D, from *S to S and changing the flag bit data supplied to the station B, from S to *S.

Figure 19:
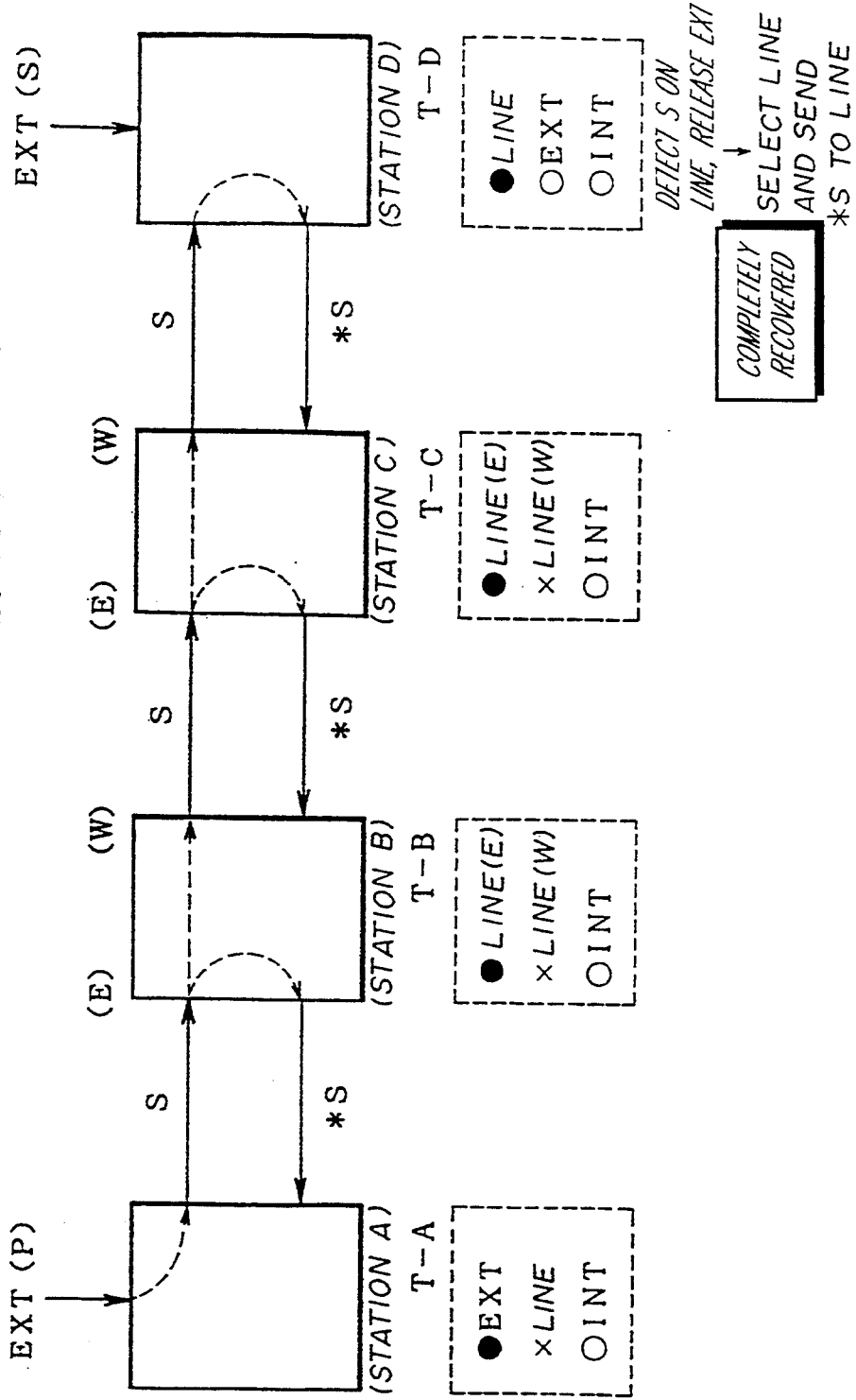
FIG. 19 illustrates the second stage of a recovery in the second embodiment of the present invention.

FIG. 19 illustrates the second stage of recovery that follows the stage shown in FIG. 18. The station D detects S on the line connected to the station C, selects the same station in accordance with the table T-C, and cancels the selection of the external synchronizing signal source EXT (S) having lower priority than the station C, while at the same time changing the flag bit data supplied to the station C, from S to *S. This way, the initial normal state shown in FIG. 15 is regained.

Figure 20:
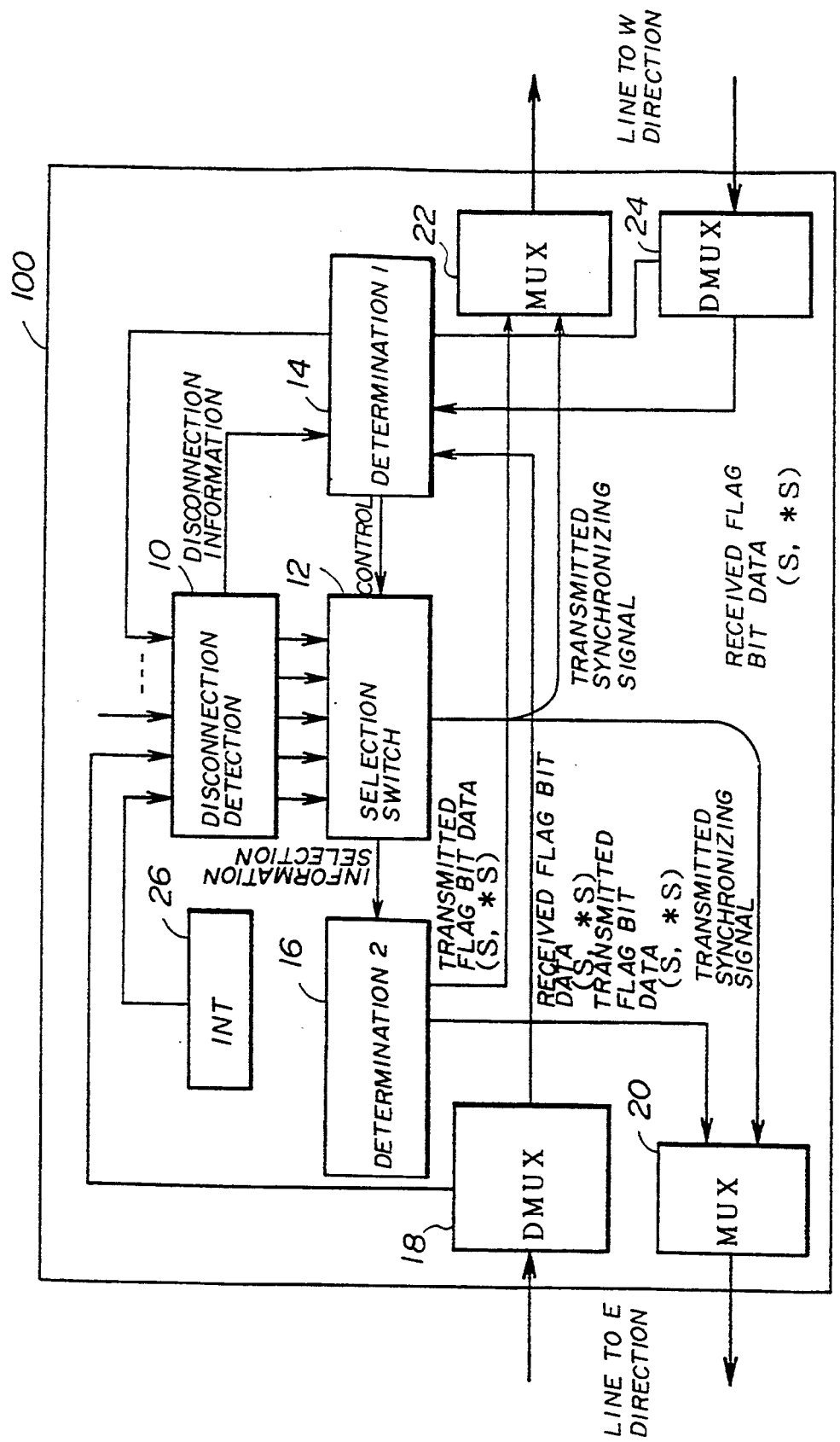
FIG. 20 is a block diagram illustrating the configuration of a station.

The configuration of the stations A–D will next be described, with reference to FIG. 20. The configuration of the station shown in FIG. 20 pertain directly to the stations B and C. That is, FIG. 20 shows the configuration of a station connected to the lines on both sides, namely, the side to the E direction and the side to the W direction. Such a station (indicated by a numeral 100 in the figure) comprises a disconnection detection portion 10, a selection switch 12, a first determination portion 14, a second determination portion 16, a demultiplexor (DMUX) portion 18, a multiplexor (MUX) portion 20, a multiplexor (MUX) portion 22, a demultiplexor (DMUX) portion 24 and an internal synchronizing signal source (INT) 26. The station A is not provided with the demultiplexor 18 and the multiplexor 20. The station D is not provided with the multiplexor 22 and the demultiplexor 24.

The disconnection detection portion 10 receives the synchronizing signal and detects the disconnection thereof. The disconnection detection portion 10 of the above-mentioned station A receives the synchronizing signal from the external synchronizing signal source EXT (P), the synchronizing signal from the internal synchronizing signal source 26 and the synchronizing signal supplied from the neighboring station via the line. Similarly, the disconnection detection portion 10 of the station D receives the synchronizing signal from the external synchronizing signal source EXT (S), the synchronizing signal from the internal synchronizing signal source 26 and the synchronizing signal supplied from the neighboring station via the line. The disconnection portions 10 of the stations Band. C receive the synchronizing signal from the internal synchronizing signal source 26 and the synchronizing signal supplied from the neighboring stations via the line to the E direction and the line to the W direction. For example, the disconnection portion 10 may be equipped with internal timers for each different synchronizing signal received and gives a determination of an absence of the synchronizing signal if that synchronizing signal is not received for a predetermined period of time.

When the disconnection detection portion 10 detects a disconnection, it outputs disconnection information to the first determination portion 14. Upon receiving this disconnection information, the first determination portion 14 gives a determination described later, by using the received flag bit data (S, *S) from the demultiplexor 18 and the received flag bit data (S, *S) from the demultiplexor 24. The first determination portion 14 outputs a control signal corresponding to the determination result to the selection switch 12. The selection switch 12 selects, on the basis of the control signal, one of the synchronizing signals and outputs, as the transmitted synchronizing signal, the selected signal to the multiplexors 20 and 22. The selection switch 12 outputs the selection information, indicating which synchronizing signal has been selected, to the second determination portion 16. The second determination portion 16 gives a determination described later by using the selection information received and sets the transmitted flag bit data. In accordance with the determination result, the second determination portion 16 then outputs the transmitted flag bit data (S, *S) to the multiplexor 20 and outputs the transmitted flag bit data (S, *S) to the multiplexor 22.

The demultiplexor 18 separates, into frames, the frame multiplexed line signal upon receiving the same signal via the line to the E direction and sends the result of separation to a signal processing portion (not shown in the figure). Moreover, the demultiplexor 18 extracts the synchronizing signal and the received flag bit data. The multiplexor 20 multiplexes a frame supplied from the signal processing portion (not shown in the figure), the transmitted synchronizing signal selected by the selection switch 12 and the transmitted flag bit data set by the second determination portion 16, and sends the resultant line signal to the line to the E direction. The multiplexor 22 multiplexes a frame supplied from the signal processing portion (not shown in the figure), the transmitted synchronizing signal selected by the selection switch 12 and the transmitted flag bit data set by the second determination portion 16, and sends the resultant line signal to the line to the W direction. The demultiplexor 24 separates, into frames, the frame multiplexed line signal received via the line to the W direction, and sends the separation result to the signal processing portion (not shown in the figure). Moreover, the demultiplexor 22 extracts the synchronizing signal and the received flag bit data.

Figure 21:
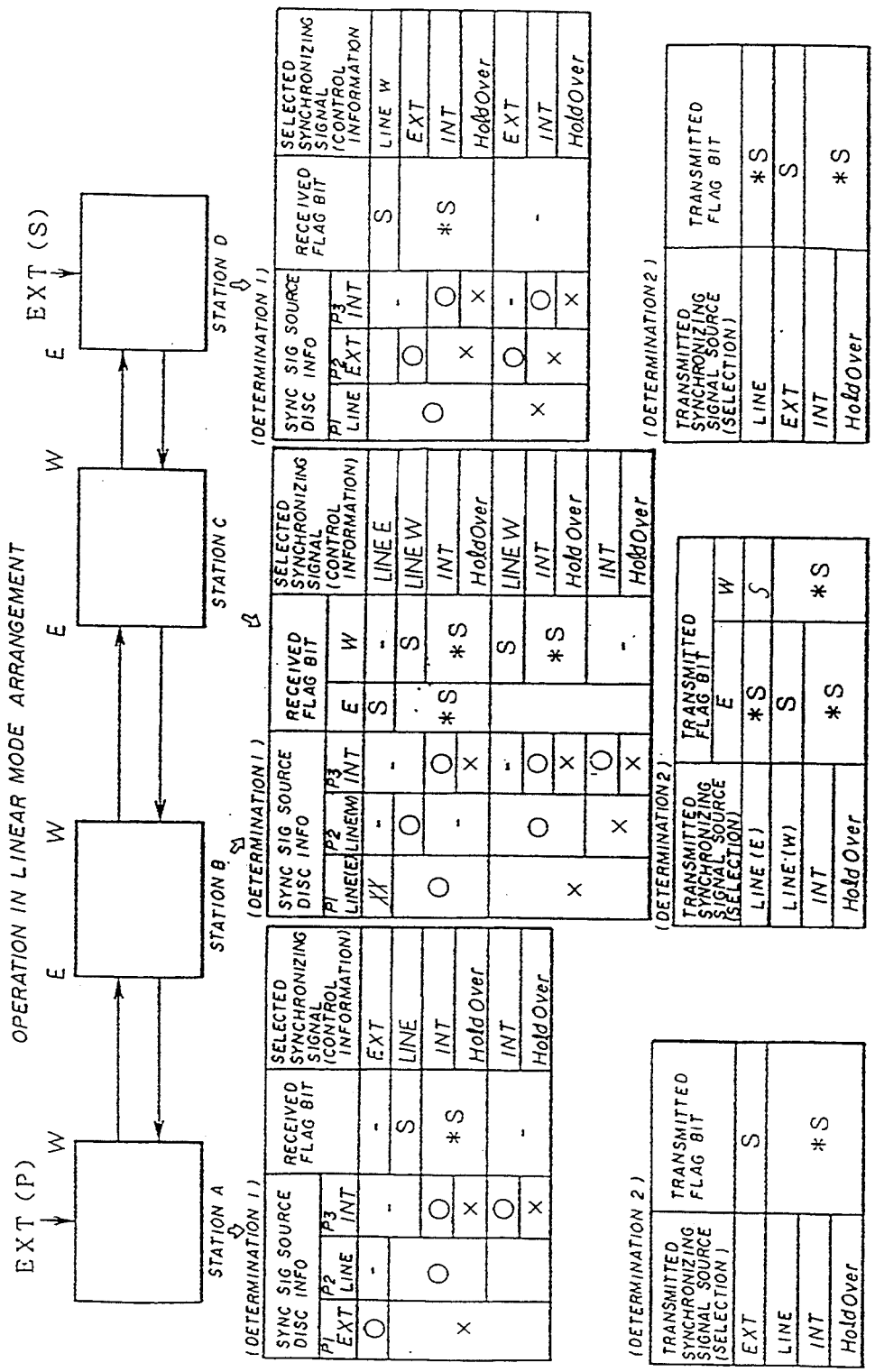
FIG. 21 shows determination operations in the stations in a linear mode arrangement.

FIG. 21 illustrates the stations A–D in a linear mode arrangement and shows the determination processes 1 and 2 carried out by the determination portion 14 and the determination portion 16 in the stations. In the figure, "◯" indicates a normal operation (where no disconnection takes place), and "X" indicates the detection of a disconnection. P1, P2 and P3 indicate the order of priority for selection of a synchronizing signal source. Holdover means a runaway state.

For example, the determination process of the first determination portion 14 of the station A is as follows. The order of priority for selection of a synchronizing signal source is such that the highest priority is given to the external synchronizing signal source EXT (P) followed by the line and the internal synchronizing signal source, in the stated order. When the external synchronizing signal source becomes disabled, the synchronizing signal from the line becomes a candidate for a synchronizing signal source. If, at this moment, the received flag bit data is S, the line is selected. If the received flag bit data is *S, the internal synchronizing signal source 26 is selected. It is of course assumed here that the internal synchronizing signal source 26 is operating normally. If the internal synchronizing signal source 26 is not operating normally, a runaway state sets in. When both the external synchronizing signal source EXT (P) and the line are disabled but the internal synchronizing signal source 26 is operating normally, the internal synchronizing signal source 26 is selected. When all the synchronizing signal sources are disabled, a runaway state sets in.

The determination process of the second determination portion 16 of the station A is as follows. When the external synchronizing signal source EXT (P) is selected, the transmitted flag bit data is set to be S. When the line or the internal synchronizing signal source 26 is selected, or when a runaway state has set in, the transmitted flag bit data is set to be *S.

The first determination portion 14 and the second determination portion 16 of the stations B and C operate as shown in the figure. The order of priority of the synchronizing signal sources for the stations B and C is such that the highest priority is given to the line to the E direction, followed by the line to the W direction and the internal synchronizing signal source 26, in the stated order. When the line to the E direction is operating normally and the received flag bit data supplied from the line to the E direction is S, the line to the E direction is selected as the synchronizing signal source. When the received flag bit data supplied from the line to the E direction is *S and the received flag bit data supplied from the line to the W direction is S, the line to the W direction is selected. When the received flag bit data supplied from the line to the E direction and the line to the W direction are *S and *S, respectively, under the condition that the internal synchronizing signal source 26 is operating normally, the internal synchronizing signal source 26 is selected. When the line to the E direction is operating normally but the internal synchronizing signal source 26 is disconnected, a holdover sets in. When the received flag bit data supplied from the line to the W direction is S under the condition that the line to the E direction is disconnected and the line to the W direction is operating normally, the line to the W direction is selected as the synchronizing signal source. When, in this case, the above-mentioned received flag bit data is *S, the internal synchronizing signal source 26 is selected. When the received flag bit data supplied from the line to the W direction is *S under the condition that only the line to the W direction is operating normally, a holdover sets in. When all of the lines are disconnected and only the internal synchronizing signal source 26 is operating normally, the internal synchronizing signal source 26 is selected. When all of the synchronizing signal sources are disconnected, a holdover sets in.

The second determination portion 16 of the stations B and C operates as follows. When the line to the E direction is selected, the transmitted flag bit data supplied to the line to the E direction and the line to the W direction are set to be *S and S, respectively. When the line to the W direction is selected, the transmitted flag bit data supplied to the line to the E direction and the line to the W direction are set to be S and *S, respectively. When the internal synchronizing signal source 26 is selected or when a holdover sets in, the transmitted flag bit data supplied to the line to the E direction and the line to the W direction are set to be *S and *S, respectively.

The first determination portion 14 and the second determination portion 16 of the station D operate as shown in FIG. 21. The order of priority for selection of a synchronizing signal source for the station D is such that the highest priority is given to the line, followed by the external synchronizing signal source EXT (P) and the internal synchronizing signal source 26, in the stated order.

Figure 22:
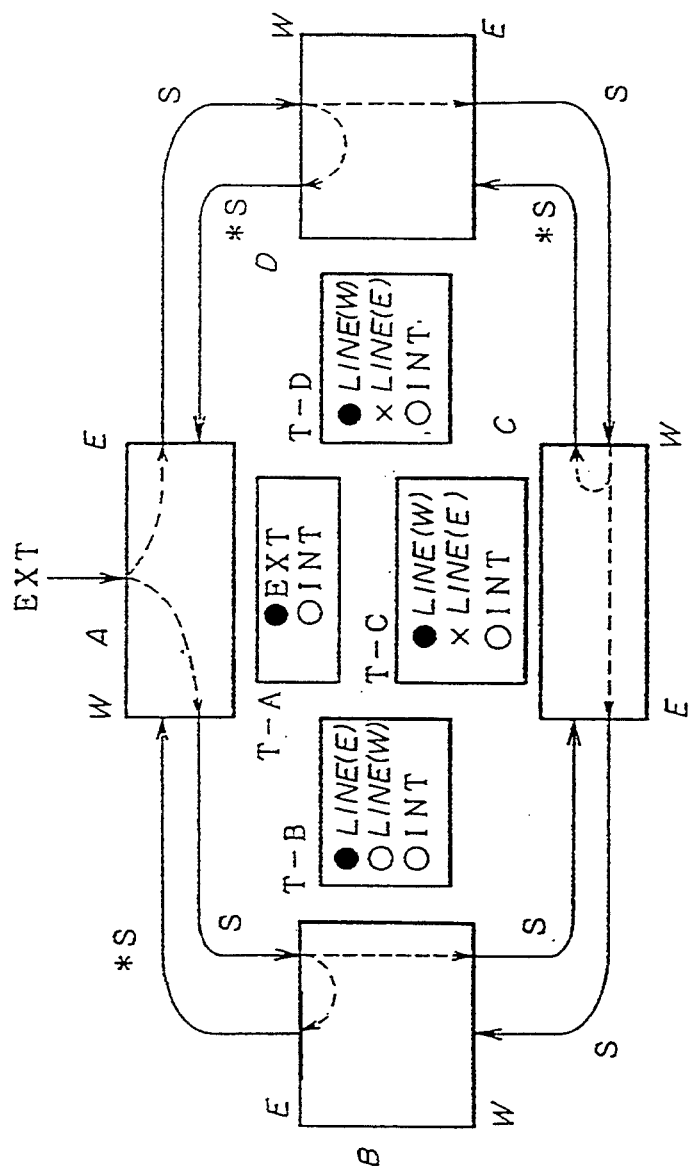
FIG. 22 illustrates a normal state of the third embodiment of the present invention.

A detailed description will next be given of the third embodiment, in which the stations A through D are arranged in a ring, that is, are in a ring mode arrangement, and an external synchronizing signal source EXT is connected to the station A. For this reason, the station A is designated a parent station. FIG. 22 shows a normal state of the third embodiment, where the signal from the external synchronizing signal source EXT is transmitted from the parent station A to the station B in the W direction in the figure. The same signal is transmitted from the station D to the station C in the E direction in the figure.

Figure 23:
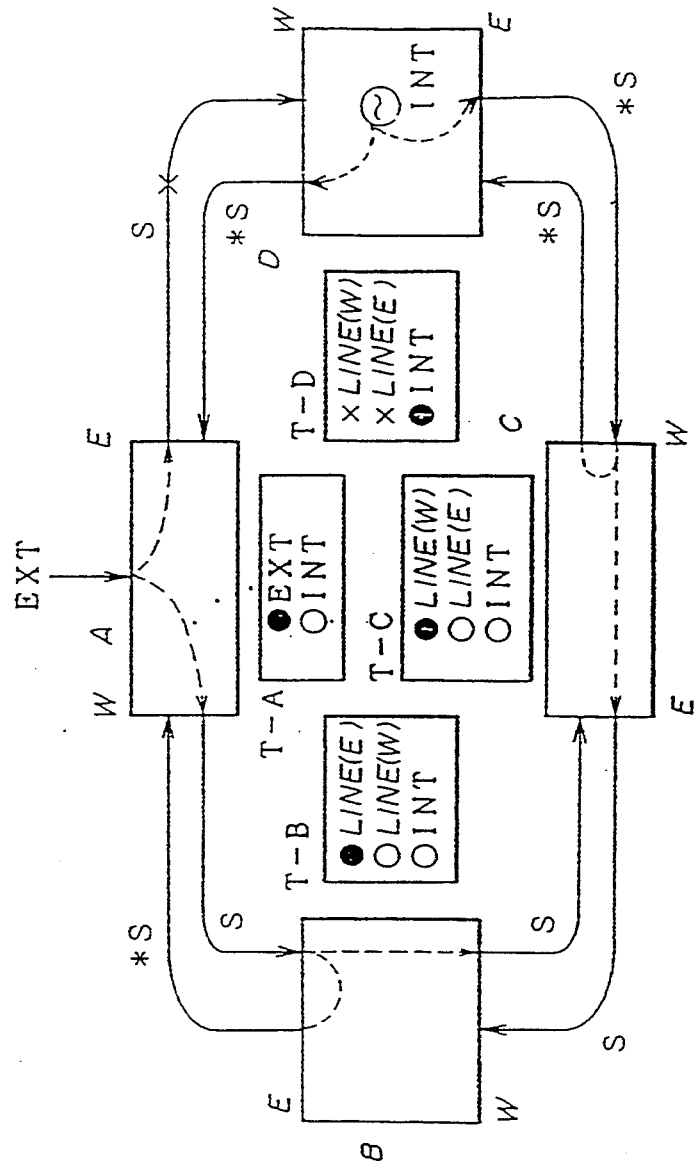
FIG. 23 illustrates the first stage of a failure occurring in the third embodiment of the present invention.

FIG. 23 illustrates the first stage of a disconnection of transmission between the station A and the station D. The station which had received the synchronizing signal from the station A now detects an absence of the flag bit data S in the received signal and checks the line connected to the station C to the E direction, which line has the next highest priority according to the table T-D. Since, however, the flag bit data supplied from the line is *S, the internal synchronizing signal source having the next highest priority is selected, while at the same time the flag bit that had been supplied to the line connected to the station C is switched from S to *S.

Figure 24:
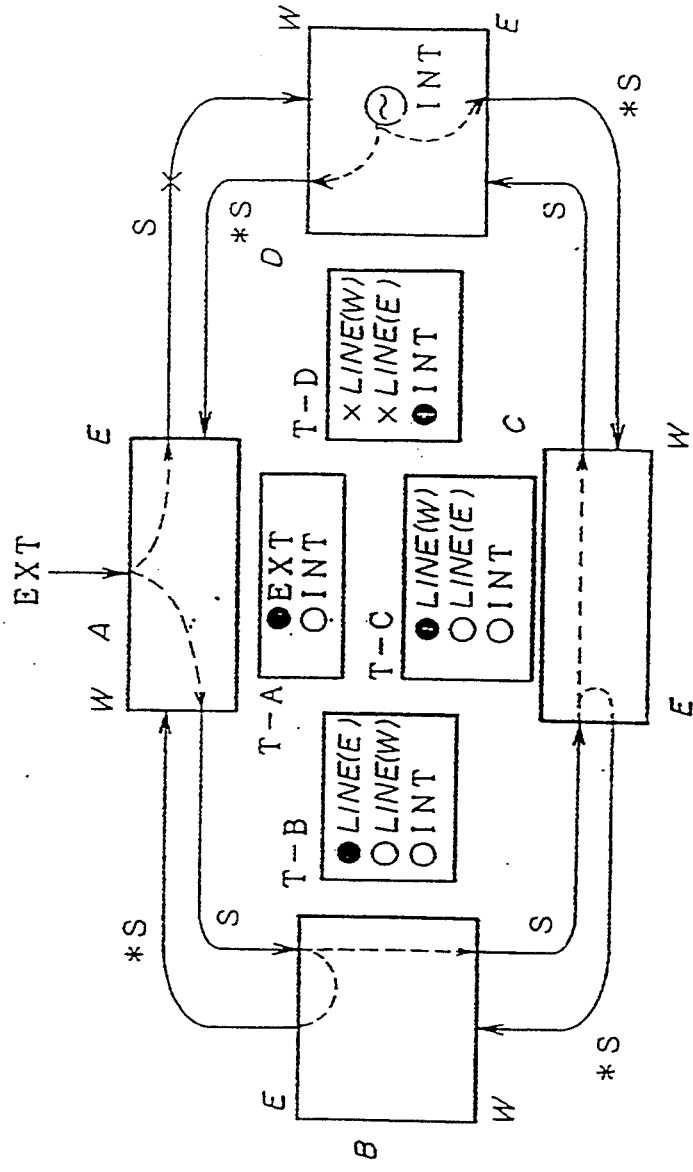
FIG. 24 illustrates the second stage of a failure occurring in the third embodiment of the present invention.

FIG. 24 illustrates the second stage that follows the stage shown in FIG. 23. The station C detects *S on the line connected to the station D and checks the line to the E direction having the next highest priority, that is, the line connected to the station B. Since the flag bit data supplied therefrom is S, the station B is put to use as a synchronizing signal source, and the flag bit data supplied to the line connected to the station B is changed from S to *S.

Figure 25:
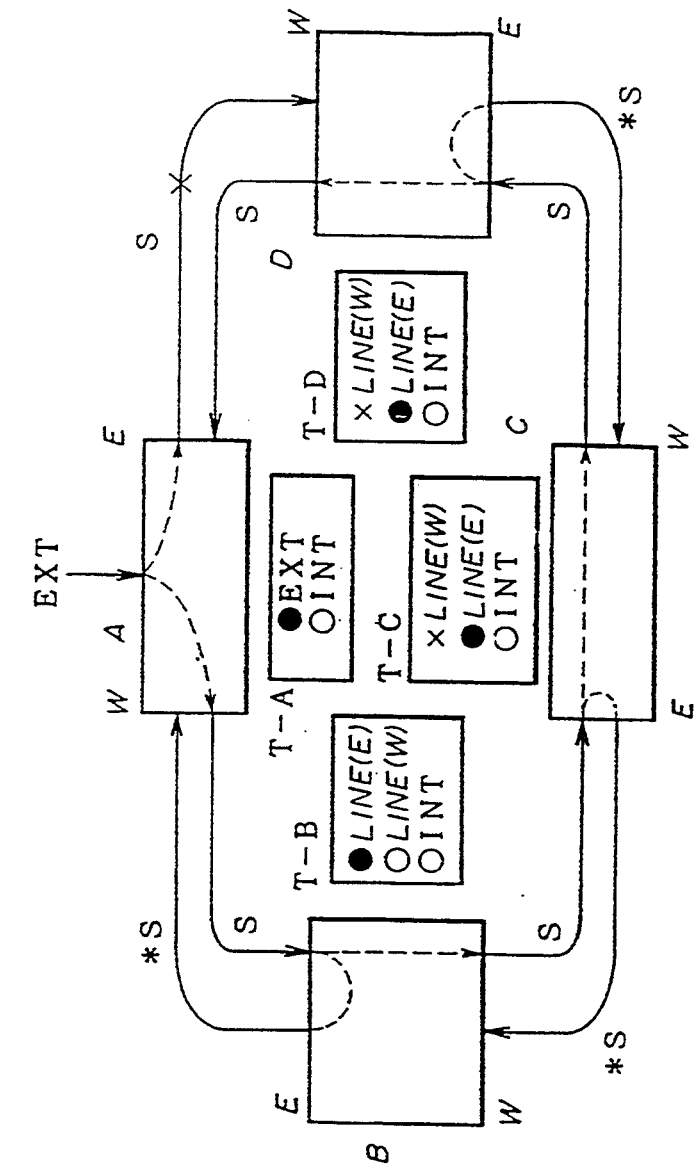
FIG. 25 illustrates the third stage of a failure occurring in the third embodiment of the present invention.

FIG. 25 illustrates the third stage that follows the stage shown in FIG. 24. The station D, which checks the state of the synchronizing signal sources constantly searching for a source having higher priority, detects S on the line connected to the station C to the E direction, which line has higher priority than the internal synchronizing signal source INT according to the table T-D, selects the line connected to the station C, and cancels the selection of the internal synchronizing signal source INT because the line connected thereto has lower priority than the line connected to the station C, while at the same time changing flag bit supplied to the line connected to the station A, from *S to S. A stable state thus being attained, the synchronizing signal from the parent station A is temporarily transmitted through the child stations B, C, D in the W direction.

A description will next be given of the procedure for recovering the channel by which to transmit the synchronizing signal to the stations.

Figure 26:
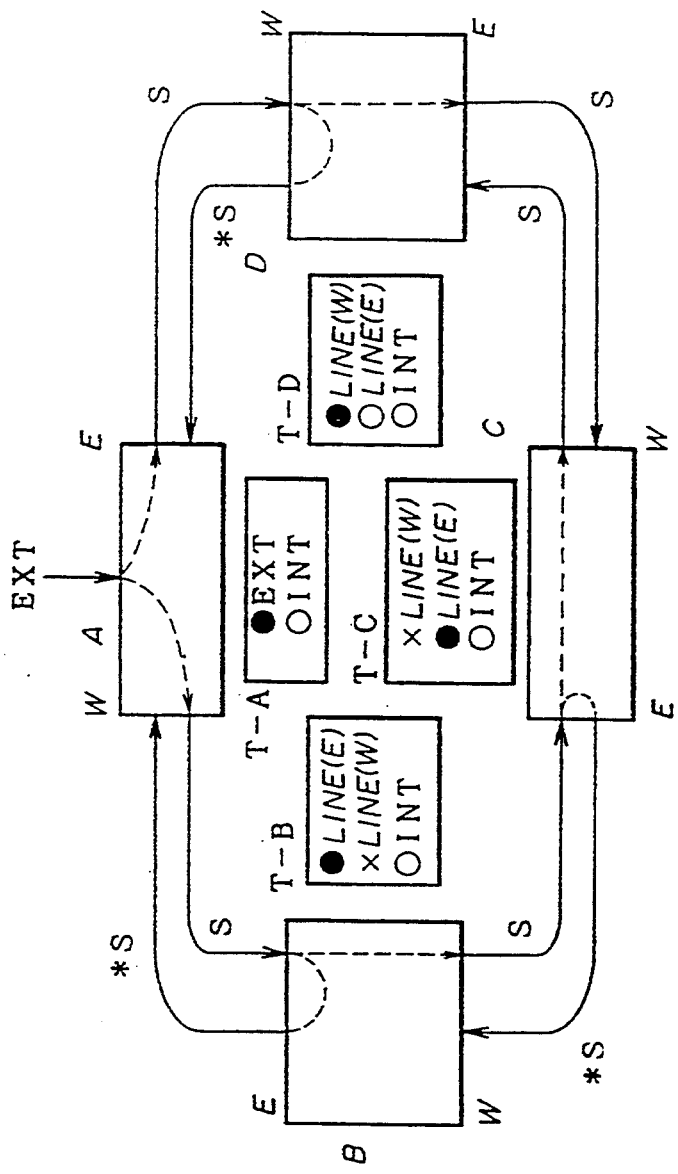
FIG. 26 illustrates the first stage of a recovery of the third embodiment of the present invention.

FIG. 26 illustrates the first stage of a recovery. The station D detects S on the line connected to the station A to the W direction, selects the same station in accordance with the table T-D and cancels the selection of the synchronizing signal supplied from the station C to the E direction because the line connected thereto has lower priority than the line connected to the station A, while at the same time changing the flag bit data supplied to the station A, from S to *S, and changing the flag bit data supplied to the station C, from *S to S.

Figure 27:
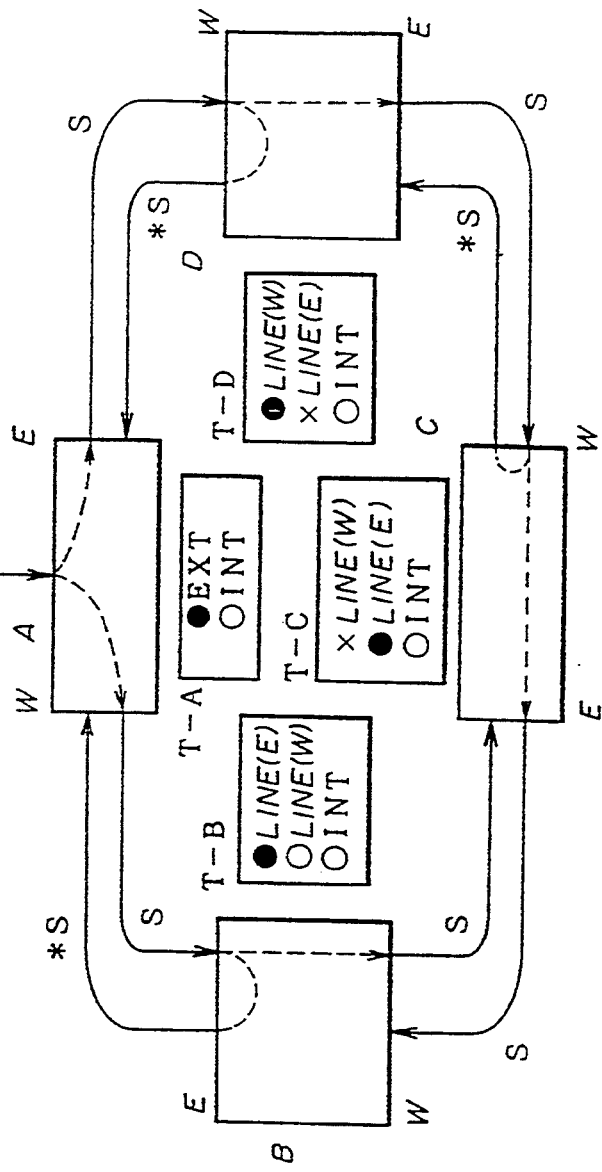
FIG. 27 illustrates the second stage of a recovery of the third embodiment of the present invention.

FIG. 27 illustrates the second stage of recovery that follows the stage shown in FIG. 26. The station C, which checks the state of the synchronizing signal sources constantly searching for a source having higher priority, detects S on the line connected to the station D to the W direction, selects the same line in accordance with the table T-C, and cancels the reception of the synchronizing signal from the station B to the E direction because the line connected thereto has lower priority than the line connected to the station D, while at the same time changing the flag bit data supplied to the station D, from S to *S, and changing the flag bit data supplied to the station B, from *S to S. This way, the initial normal state shown in FIG. 18 is regained.

Figure 28:
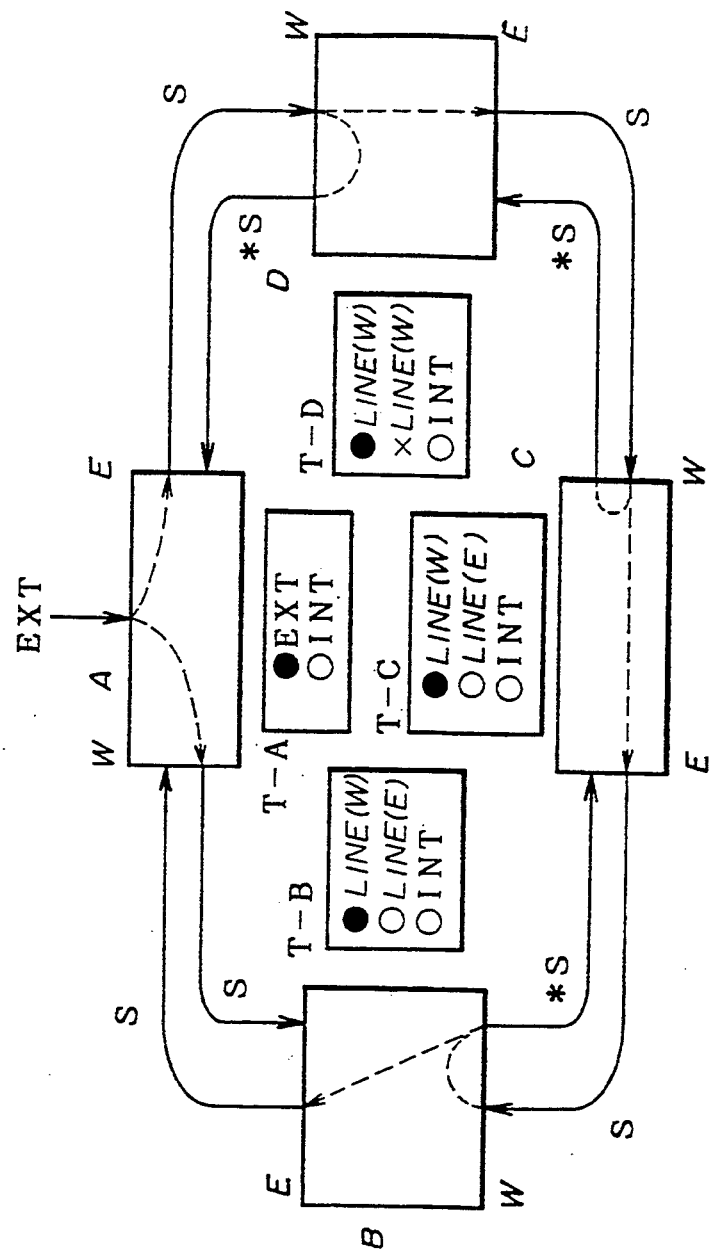
FIG. 28 illustrates a normal state of the fourth embodiment of the present invention.

A description will next be given, with reference to FIGS. 28 through 36, of the fourth embodiment, in which the stations A through D are in a ring mode arrangement as in the third embodiment and the external synchronizing signal source is connected to the station A, but the synchronizing signal is made to circulate in the E direction with respect to the parent station, that is, all of the child stations B through D are fed the synchronizing signal from the W direction thereof. Unlike the third embodiment, such an operation requires that all of the tables specifying the order of priority for the child stations allow the line (W) to be placed at the top of the order, as shown in FIG. 28.

Figure 29:
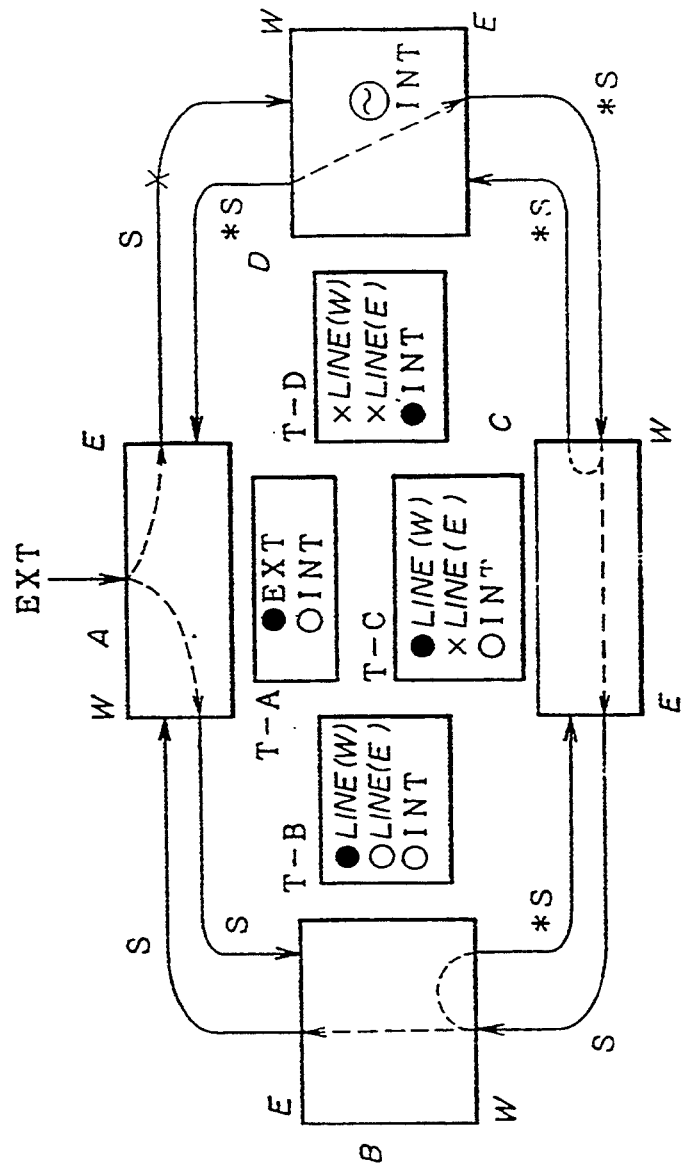
FIG. 29 illustrates the first stage of a failure occurring in the fourth embodiment of the present invention.

FIG. 29 illustrates the first stage of a disconnection of transmission between the station A and the station D. As in the third embodiment, the station D, which had received the synchronizing signal from the station A, detects an absence of the flag bit data S and checks the line connected to the station C to the E direction, which line has the next highest priority according to the table T-A. Since, however, the flag bit supplied from that line is *S, the internal synchronizing signal source INT having the next highest priority is selected, while at the same time the flag bit data that had been supplied to the line connected to the station C is changed from S to *S.

Figure 30:
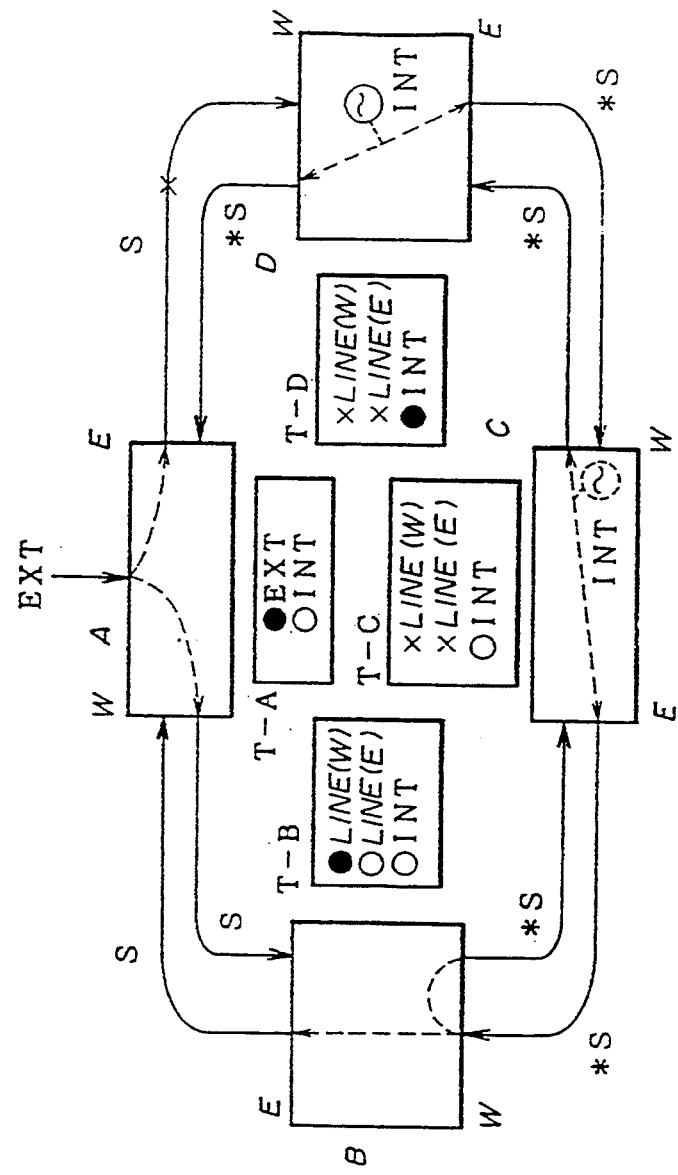
FIG. 30 illustrates the second stage of a failure occurring in the fourth embodiment of the present invention.

FIG. 30 illustrates the second stage that follows the stage shown in FIG. 29. The station C detects *S on the line connected to the station D and checks, in accordance with the table T-B, the line connected to the station B to the E direction, which line has the next highest priority. Since *S is again detected, the internal synchronizing signal source INT is put to use, while at the same time the flag bit data supplied to the line connected to the station B is changed from S to *S.

Figure 31:
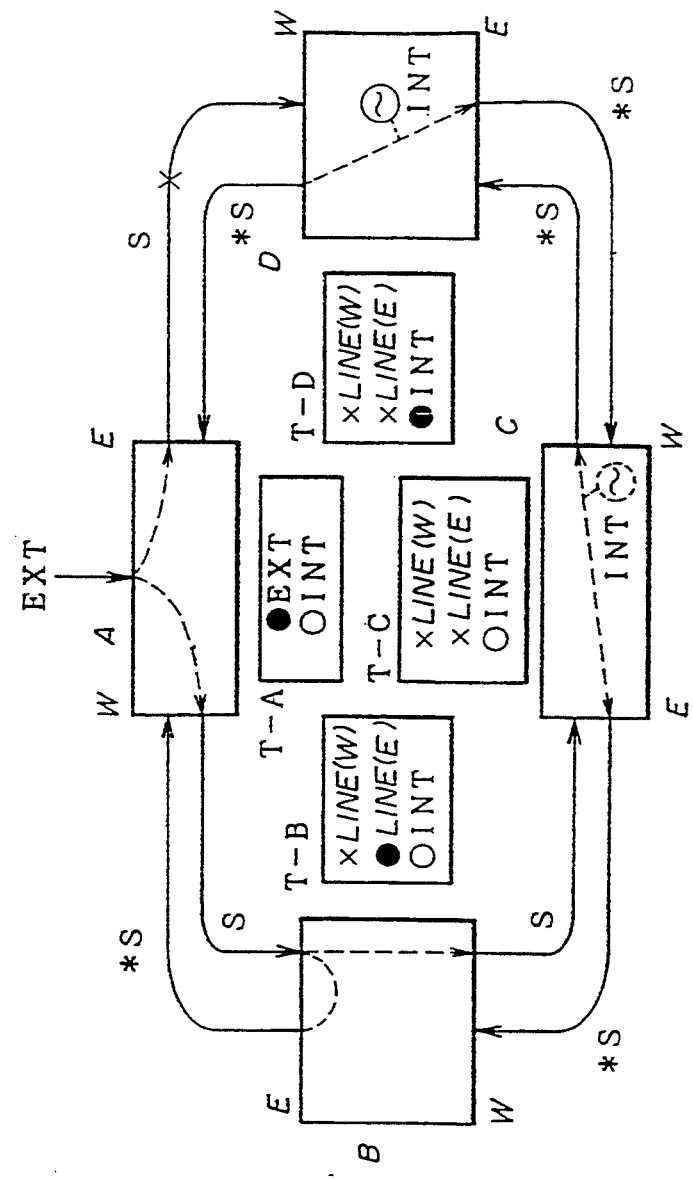
FIG. 31 illustrates the third stage of a failure occurring in the fourth embodiment of the present invention.

FIG. 31 illustrates the third stage that follows the stage shown in FIG. 30. Detecting *S on the line connected to the station C to the W direction and having the highest priority according to the table T-B, the station B checks the flag bit data supplied from the line connected to the station A to the E direction, which line has the next highest priority. Since the flag bit data S is detected, the station A is selected as the synchronizing signal source, while at the same time the flag bit data supplied to the line connected to the station A is changed from S to *S, and the flag bit data supplied to the line connected to the station C is changed from *S to S.

Figure 32:
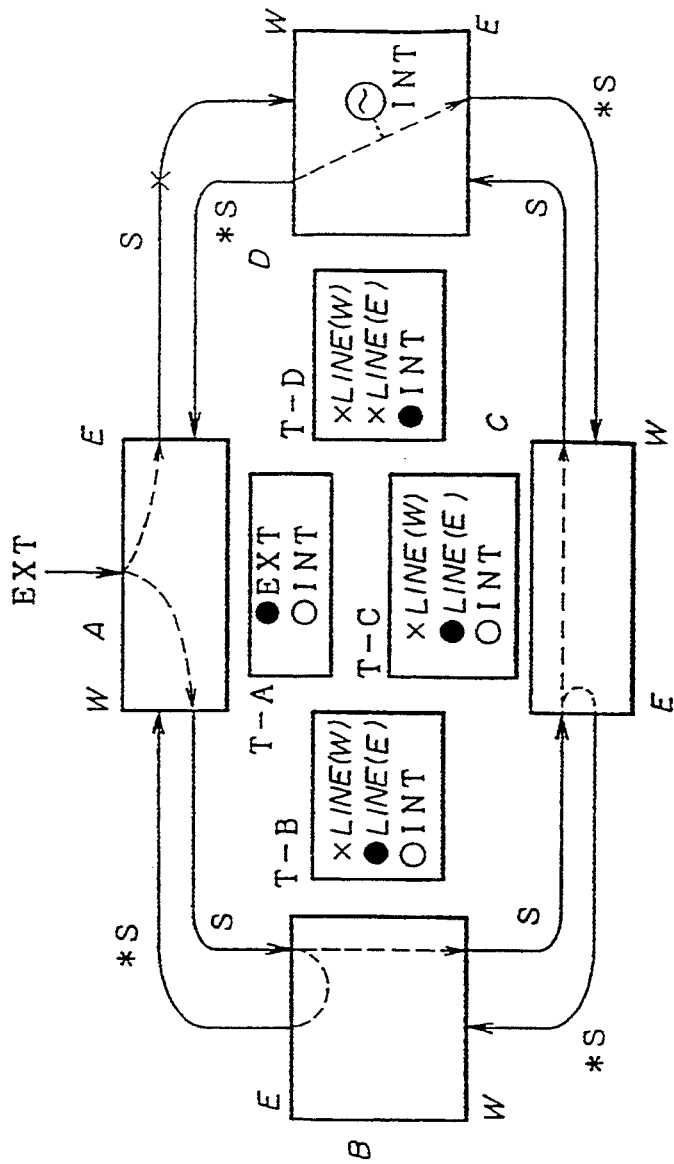
FIG. 32 illustrates the fourth stage of a failure occurring in the fourth embodiment of the present invention.
Figure 33:
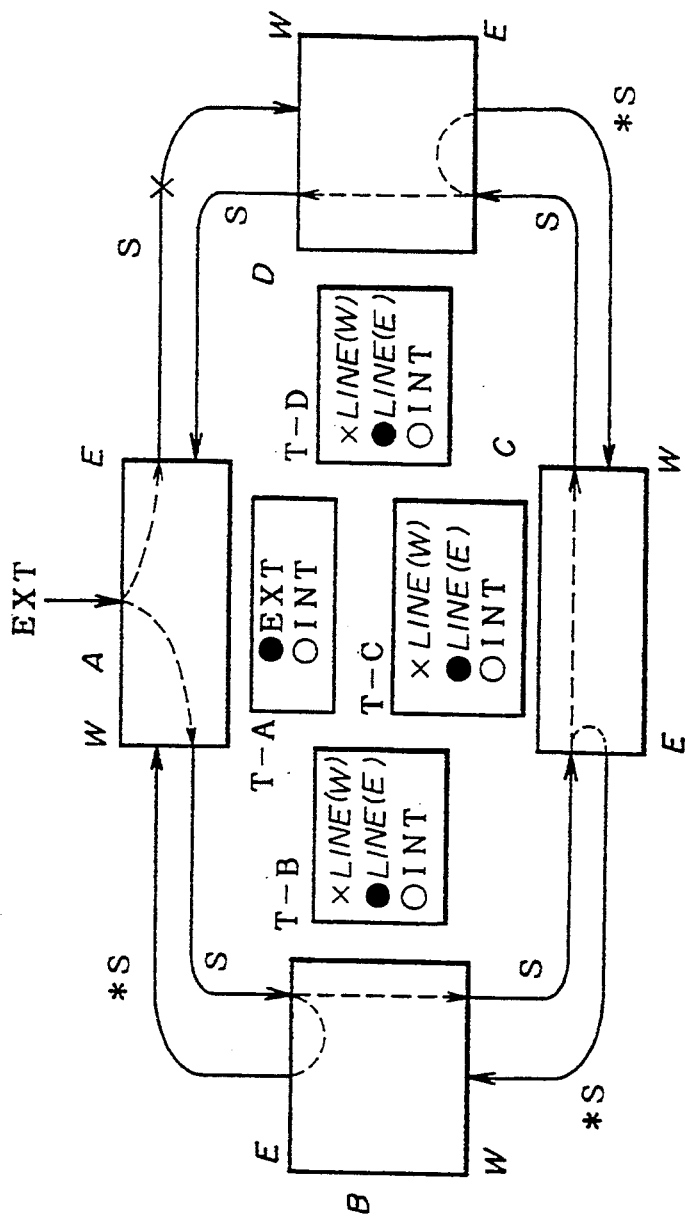
FIG. 33 illustrates the fifth stage of a failure occurring in the fourth embodiment of the present invention.

FIG. 32 illustrates the fourth stage that follows the stage shown in FIG. 31. The station C, which checks the state of the synchronizing signal sources constantly searching for a source having higher priority, detects S on the line connected to the station B and changes, in accordance with the table T-C, over to the line connected to the station B as the synchronizing signal source, while at the same time changing the flag bit data supplied to the station D, from *S to S.

FIG. 32 illustrates the fourth stage that follows the stage shown in FIG. 31. The station C, which checks the state of the synchronizing signal sources constantly searching for a source having higher priority, detects S on the line connected to the station to the E direction, which line has higher priority than the internal synchronizing signal source INT according to the table T-D, and selects the same line, while at the same time changing the flag bit data supplied to the line connected to the station A, from *S to S. A stable state thus being attained, the synchronizing signal is temporarily transmitted through the child stations B, C, D in the W direction with respect to the parent station A.

A description will below be given of how the channel for transmitting the synchronizing signal to the stations is recovered when the failure is removed.

Figure 34:
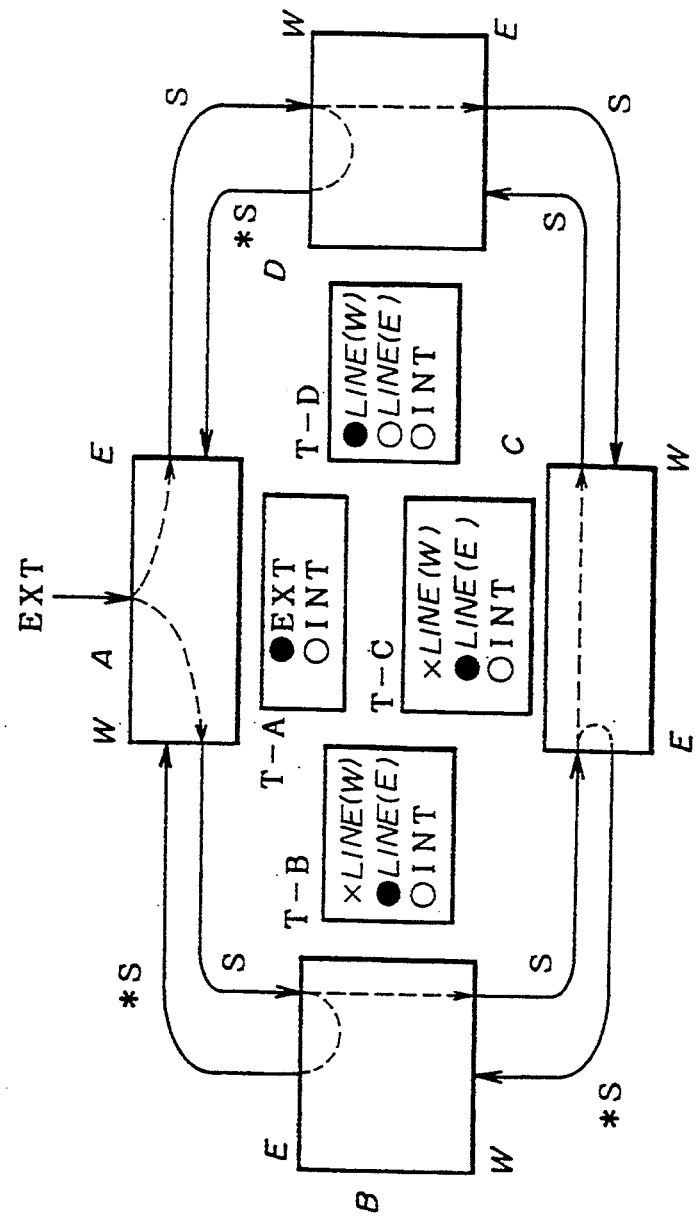
FIG. 34 illustrates the first stage of a recovery in the fourth embodiment of the present invention.

FIG. 34 illustrates the first stage of a recovery. The station D detects S on the line connected to the station A to the W direction, selects the same line in accordance with the table T-D and cancels the selection of the synchronizing signal from the station C because the line connected thereto has lower priority than the line connected to the station A, while at the same time changing the flag bit data supplied to the station A, from S to *S, and changing the flag bit data supplied to the station C, from *S to S.

Figure 35:
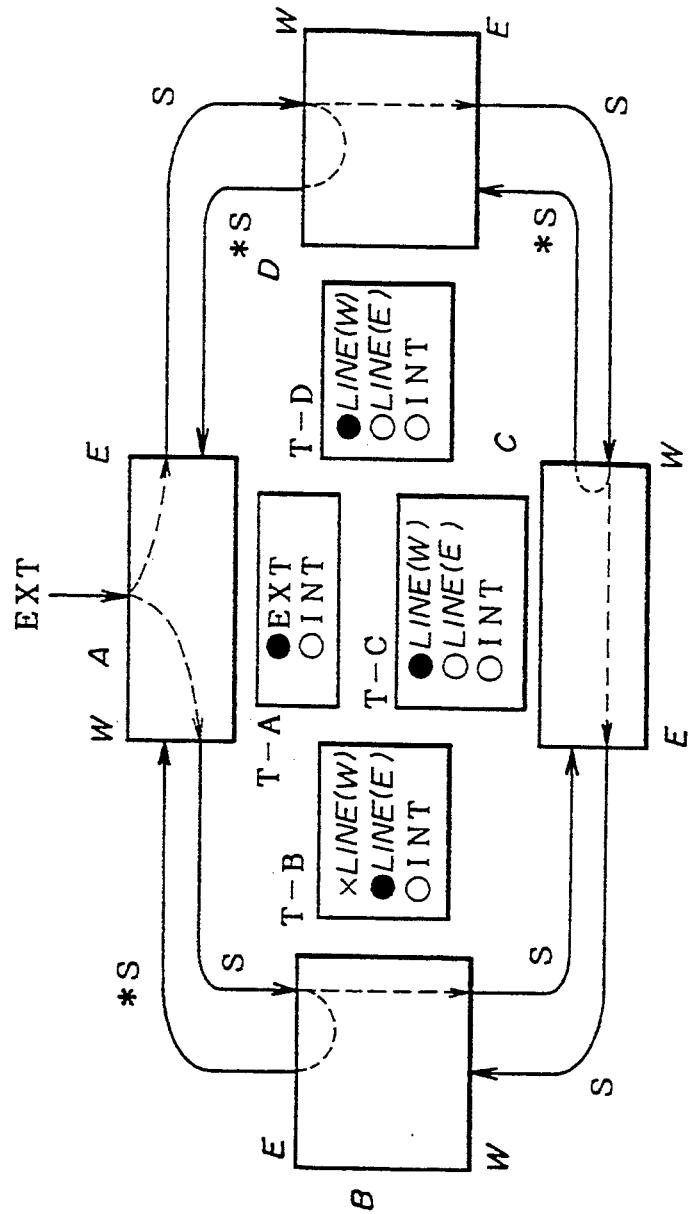
FIG. 35 illustrates the second stage of a recovery in the fourth embodiment of the present invention.

FIG. 35 illustrates the second stage of a recovery that follows the stage shown in FIG. 34. The station C, which checks the state of the synchronizing signal sources constantly searching for a source having higher priority, detects S on the line connected to the station D to the W direction, selects the same line in accordance with the table T-C and cancels the selection of the synchronizing signal from the station B to the E direction because the line connected thereto has lower priority than the line connected to the station D, while at the same time changing the flag bit data supplied to the station D, from S to *S, and changing the flag bit data supplied to the station B, from *S to S.

Figure 36:
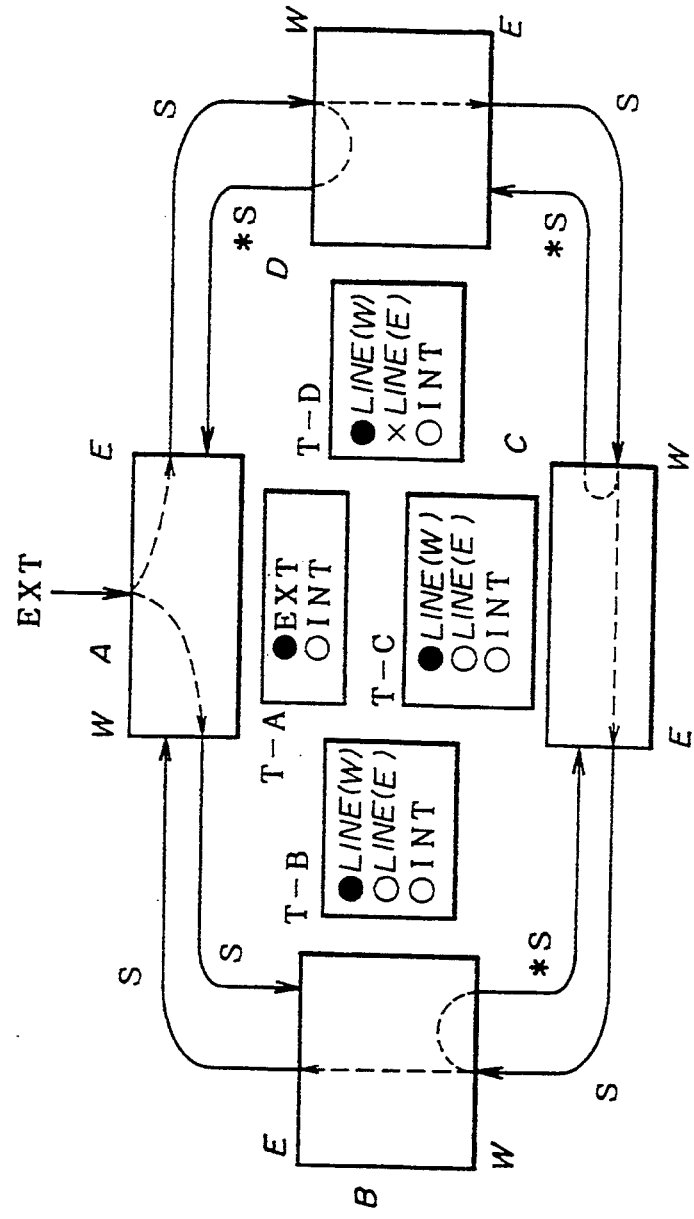
FIG. 36 illustrates the third stage of a recovery in the fourth embodiment of the present invention.

FIG. 36 illustrates the third stage of a recovery that follows the stage shown in FIG. 35. The station B, which constantly checks the state of the synchronizing signal sources having higher priority than the currently used source, detects S on the line connected to the station C to the W direction and selects the same line in accordance with the table T-B and cancels the reception of the synchronizing signal from the station A to the E direction because the line connected thereto has lower priority than the line connected to the station C, while at the same time changing the flag bit supplied to the station C, from S to *S, and changing the flag bit data supplied to the station A, from *S to S. This way, the initial normal state shown in FIG. 24 is regained.

Figure 37:
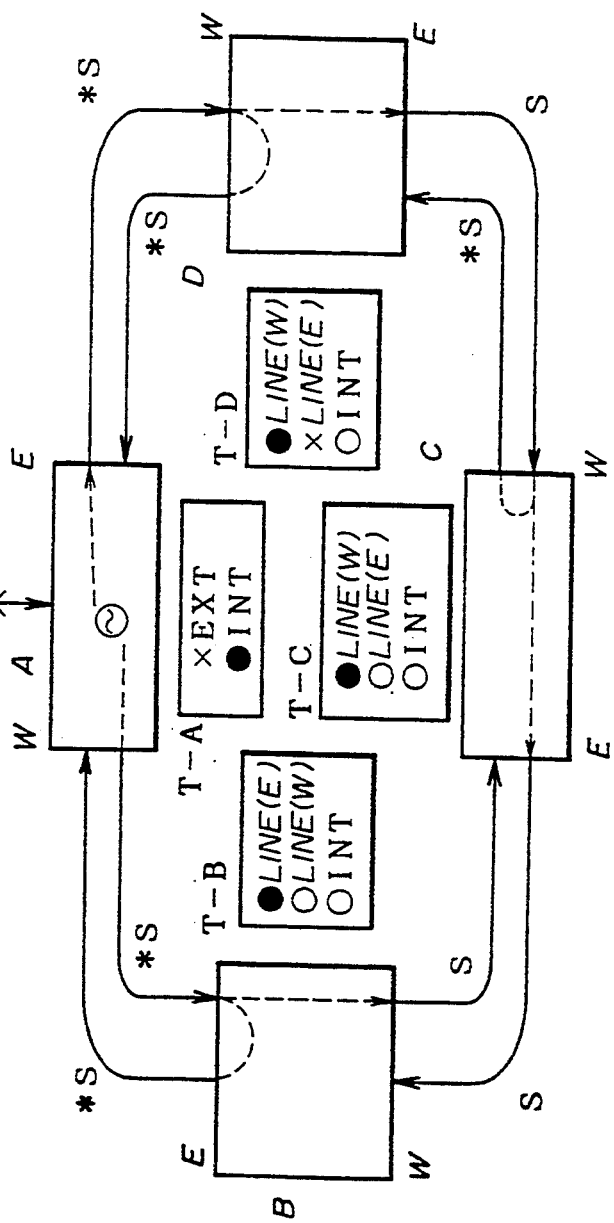
FIG. 37 illustrates the first stage of a failure occurring in the fifth embodiment of the present invention.

A description will below be given of the fifth embodiment, in which the stations A through D are in a ring mode arrangement as in the third embodiment, the external synchronizing signal source is connected to the parent station A, the assumption in this embodiment being that the external synchronizing signal source EXT is disconnected. The normal state is the same as the one shown in FIG. 22. The first stage of a disconnection of EXT is illustrated in FIG. 37. The station A served by the external synchronizing signal source EXT detects an absence of the flag bit S supplied from the external synchronizing signal source EXT and selects the internal synchronizing signal source having the next highest priority according to the table T-A, while at the same time changing the flag bit data, which had been transmitted to the neighboring stations B and D which stations had received the synchronizing signal from the station A, from S to *S.

Figure 38:
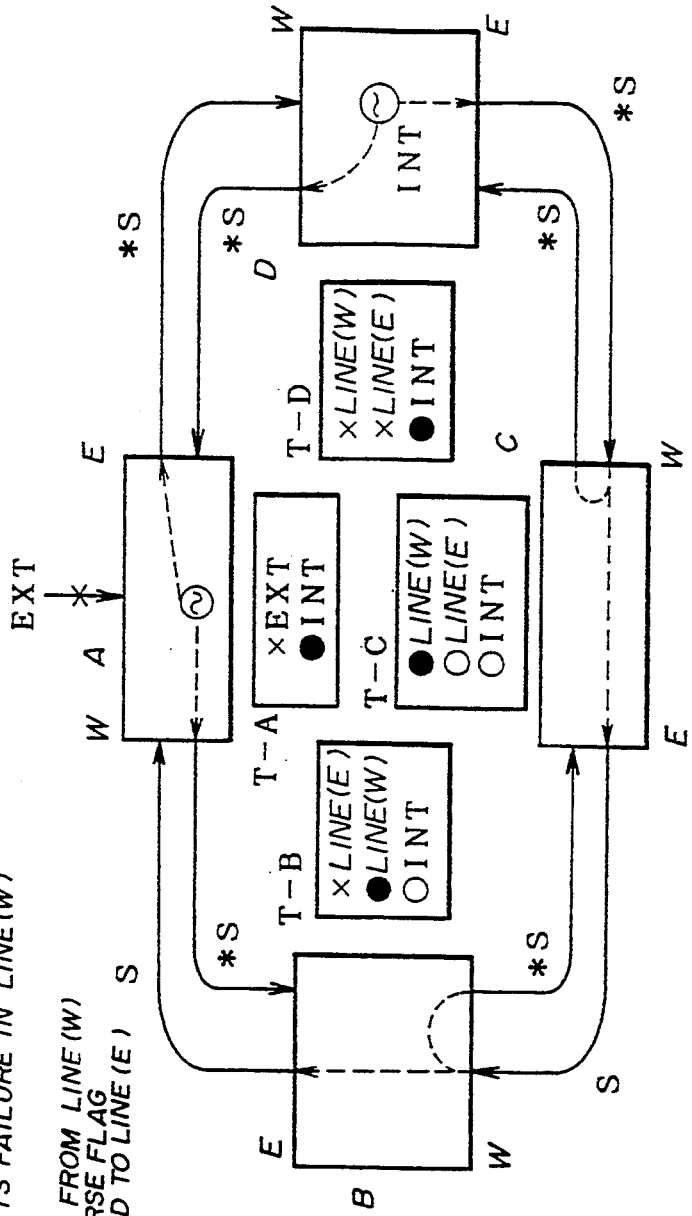
FIG. 38 illustrates the second stage of a failure occurring in the fifth embodiment of the present invention.

FIG. 38 illustrates the second stage that follows the stage shown in FIG. 37. The station D detects *S on the line connected to the station A and checks, in accordance with the table T-D, the line connected to the station C to the E direction, which line has the next highest priority. Since *S is again detected, the internal synchronizing signal INT is then put to use, while at the same time the flag bit supplied to the line connected to the station C is changed from S to *S. The station B also detects *S on the line connected to the station A and checks, in accordance with the table T-B, the line connected to the station C to the W direction, which line has the next highest priority. Since S is detected, the line connected to the station C is put to use as the synchronizing signal source, while at the same time the flag bit data supplied to the line connected to the station C is changed from S to *S and the flag bit data supplied to the line connected to the station A is changed from *S to S.

Figure 39:
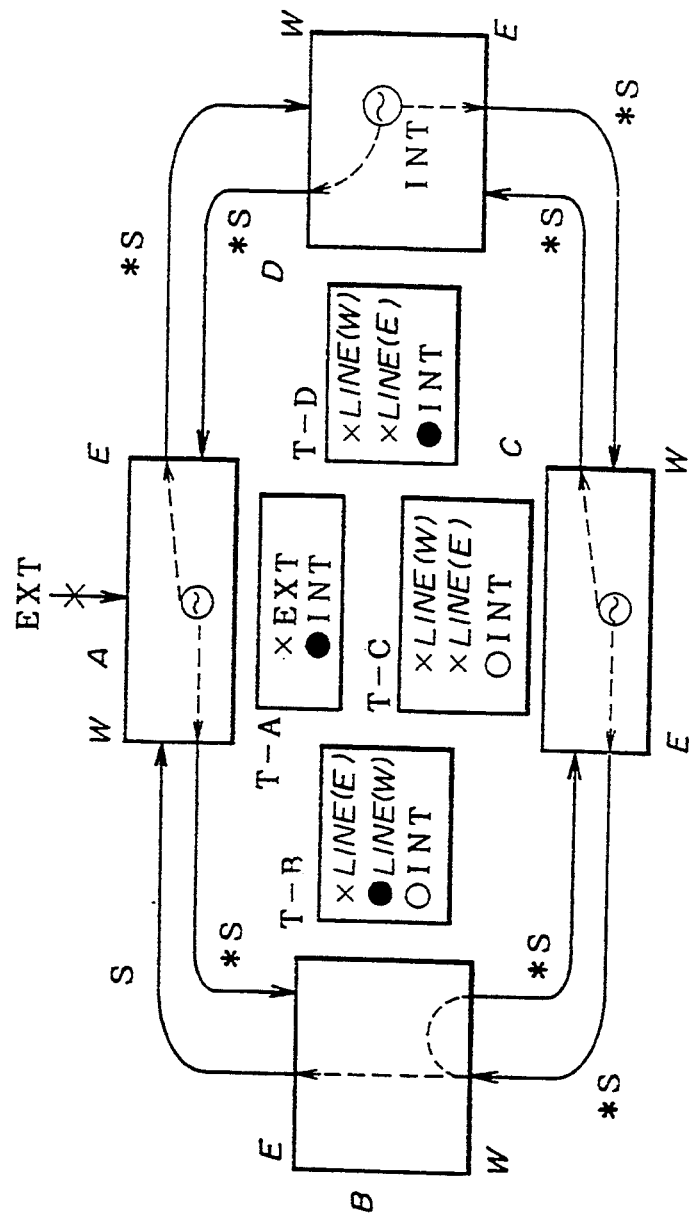
FIG. 39 illustrates the third stage of a failure-occurring in the fifth embodiment of the present invention.

FIG. 39 illustrates the third stage that follows the stage shown in FIG. 38. The station C, detecting *S on the line connected to the station D to the W direction, which line has the highest priority according to the table T-C, checks the flag bit data from the station B to the E direction because the line connected thereto has the next highest priority. Since *S is detected again, the internal synchronizing signal source is put to use, while at the same time the flag bit data supplied to the line connected to the station B is changed from S to *S.

Figure 40:
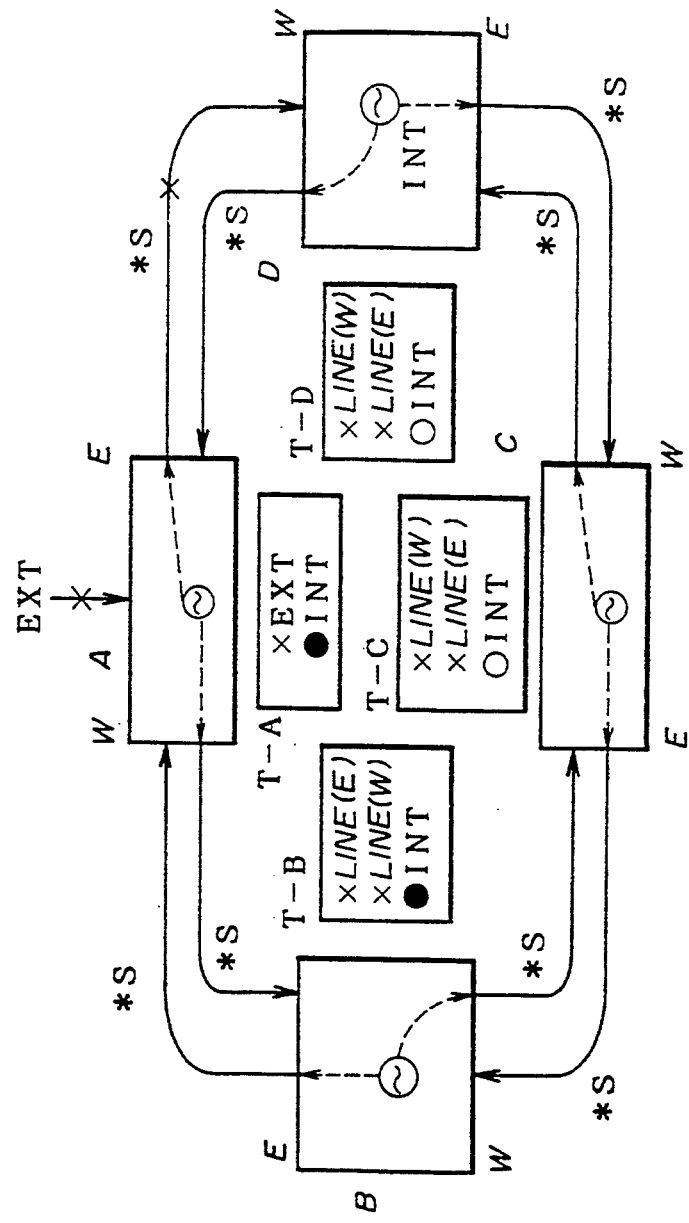
FIG. 40 illustrates the fourth stage of a failure occurring in the fifth embodiment of the present invention.

FIG. 40 illustrates the fourth stage that follows the stage shown in FIG. 39. The station B detects *S on the line connected to the station C and changes over to the internal synchronizing signal source, while at the same time changing the flag bit data supplied to the line connected to the station A, from S to *S. That is, the station B changes over from the line (E) to the line (W) in a brief moment, but INT is put to use in no time, thereby putting the whole network temporarily in a stable state.

A description will next be given of how the channel for transmitting the synchronizing signal to the stations is recovered when the failure is removed.

Figure 41:
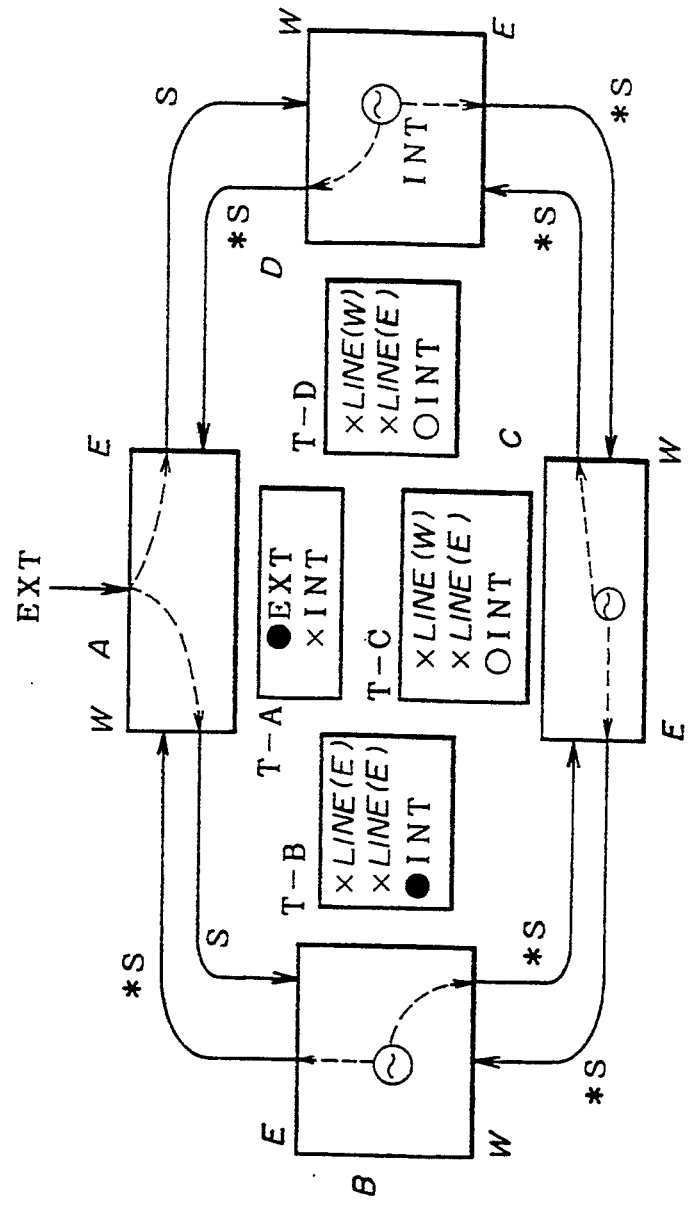
FIG. 41 illustrates the first stage of a recovery in the fifth embodiment of the present invention.

FIG. 41 illustrates the first stage of a recovery. The station A detects S from the external synchronizing signal source EXT and selects EXT, while at the same time changing the flag bit data supplied to the neighboring stations B and D, from *S to S.

Figure 42:
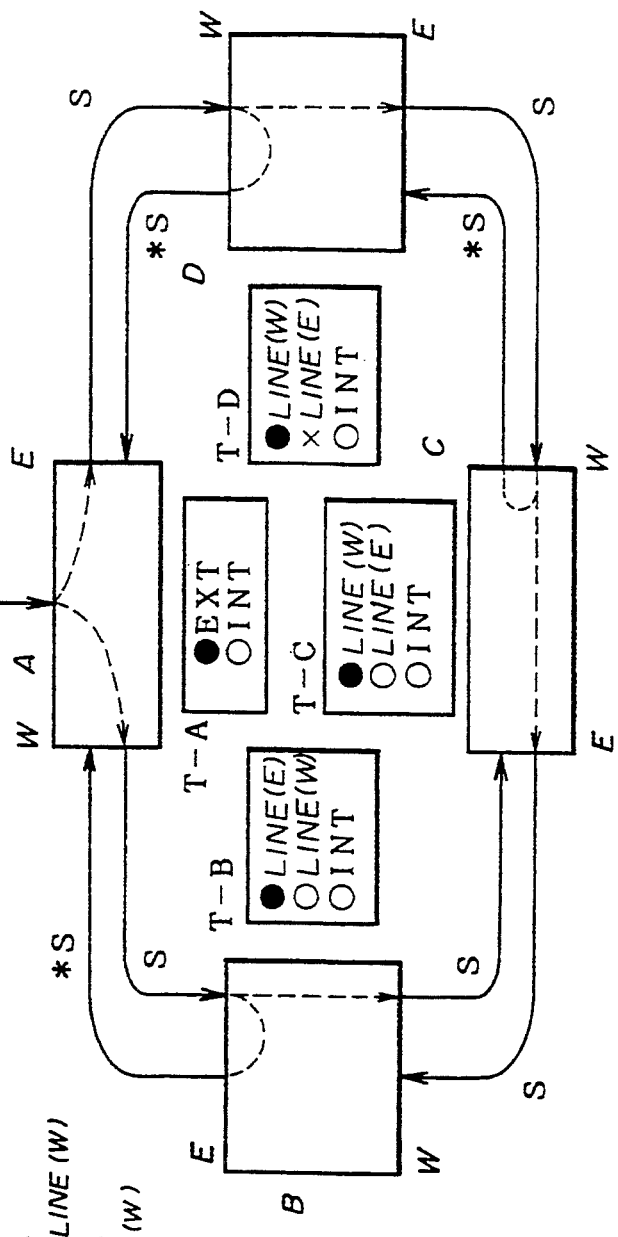
FIG. 42 illustrates the second stage of a recovery in the fifth embodiment of the present invention.

FIG. 42 illustrates the second stage of recovery that follows the stage shown in FIG. 51. The station D, which constantly checks the state of the synchronizing signal sources having higher priority than the currently used source, detects S on the line connected to the station A to the W direction and selects the same line in accordance with the table T-D, while at the same time changing the flag bit data supplied to the station C, from *S to S. The station B, which constantly checks the state of the synchronizing signal sources having higher priority than the currently used source, detects S on the line connected to the station A to the E direction and selects the same line in accordance with the table T-B, while at the same time changing the flag bit data supplied to the station C, from *S to S. As a result of this, the station C detects S on the lines to both directions, i.e., the E and W directions, and selects the line (W) because it has the highest priority. This way, the initial normal state is regained.

Figure 43:
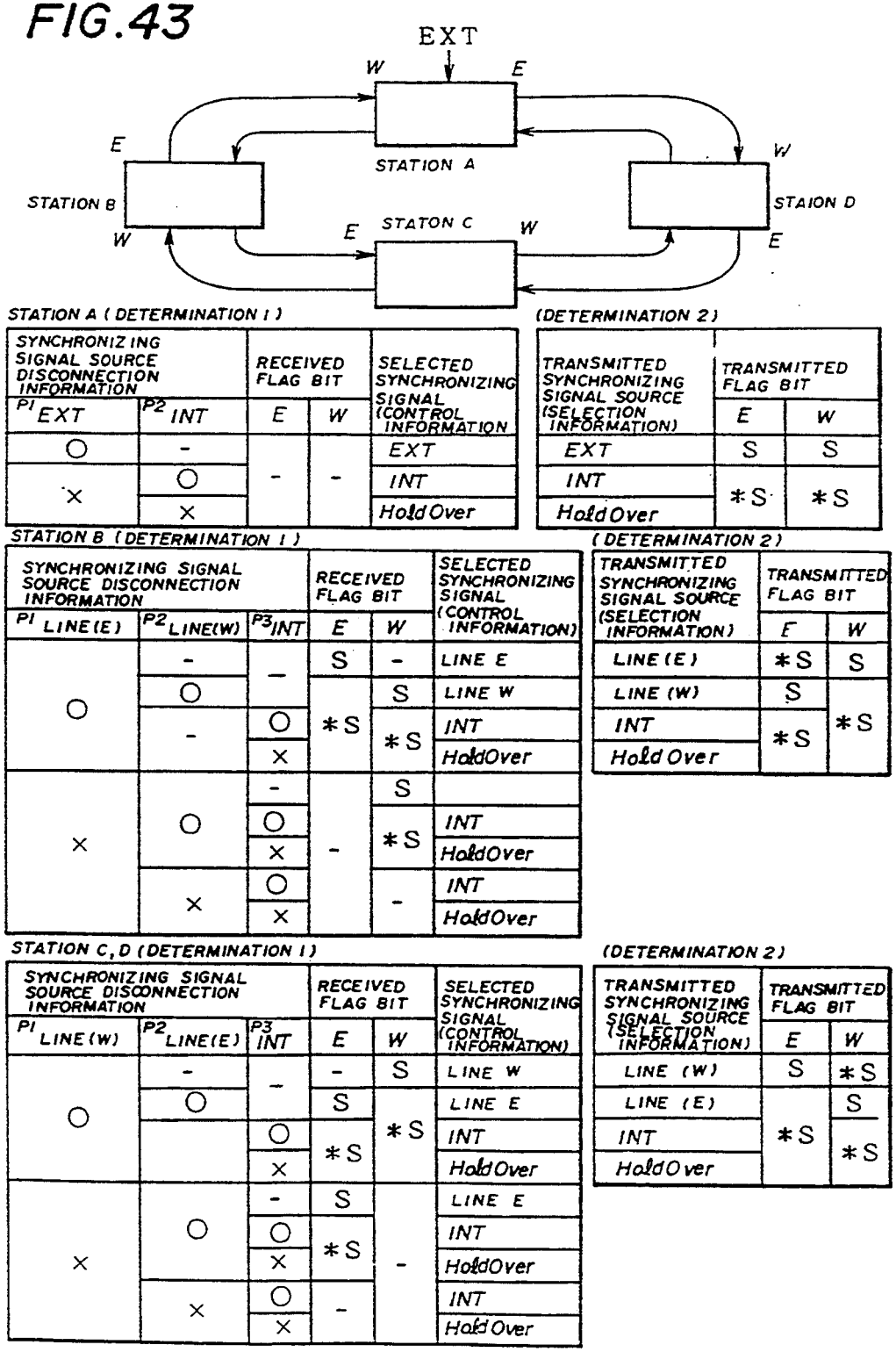
FIG. 43 shows determination operations in the stations arranged in a ring mode.

FIG. 43 shows the stations A-D in a ring mode arrangement and the determination processes 1 and 2 carried out by the first determination portion 14 and the second determination portion 16 in the stations. In the figure, "○" indicates a normal operation (where no disconnection takes place), and "X" indicates a detection of a disconnection. P1, P2 and P3 signify the order of priority for selection of a synchronizing signal source. Holdover means a runaway state. The configuration of each station is the same as described with reference to FIG. 20.

For example, the determination is processed as follows in the first determination portion 14 of the station A. The order of priority for selection of a synchronizing signal source is such that the highest priority is given to the external synchronizing signal source EXT, followed by the internal synchronizing signal source 26. When the external synchronizing signal source EXT is operating normally, it is selected as the synchronizing signal source. When the external synchronizing signal source is disabled, the internal synchronizing source 26 becomes the candidate for the synchronizing signal source. If, in this instance, the internal synchronizing signal source 26 is operating normally, it is selected as the synchronizing signal source. If the internal synchronizing signal source 26 is disconnected, a runaway state sets in.

The determination is processed as follows in the second determination portion 16 of the station A. When the external synchronizing signal source EXT is selected, the transmitted flag bit data, supplied to the lines to the E and W directions, are set to be S. When the internal synchronizing signal source 26 is selected or when a runaway state has set in, the transmitted flag bit data supplied to the lines to both directions are set to be *S.

The first determination portion 14 and the second determination portion 16 of the station B operate as shown in the same figure. The order of priority for selection of a synchronizing signal source for the station B is such that the highest priority is given to the line to the E direction, followed by the line to the W direction and the internal synchronizing signal source 26, in the stated order. When the line to the E direction is operating normally and the flag bit data received from the line to the E direction is S, the line to the E direction is selected as the synchronizing signal source. When the flag bit data supplied from the line to the E direction is *S and the flag bit data supplied from the line to the W direction is S, the line to the W direction is selected. When the flag bit data supplied from the lines to the E and W directions are *S and *S, respectively, under the condition that the internal synchronizing signal source 26 is operating normally, the internal synchronizing signal source 26 is selected. When the line to the E direction is operating normally and the internal synchronizing signal source 26 is disconnected, a holdover sets in. When the flag bit data received from the line to the W direction is S under the condition that the line to the E direction is disconnected and the line to the W direction is operating normally, the line to the W direction is selected as the synchronizing signal source. When, in this instance, the flag bit data received from the line to the W direction is *S, the internal synchronizing signal source 26 is selected. When the flag bit data received from the line to the W direction is *S under the condition that only the line to the W direction is operating normally, a holdover sets in. When all of the lines are disconnected and only the internal synchronizing signal source 26 is operating normally, the internal synchronizing signal source 26 is selected. When all of the synchronizing signal sources are disconnected or unavailable, a holdover sets in.

The second determination portion 16 of the station B operates as follows. When the line to the E direction is selected, the flag bit data supplied from the lines to the E and W directions are set to be *S and S, respectively.

When the line to the W direction is selected, the flag bit data supplied from the lines to the E and W directions are set to be S and *S, respectively. When the internal synchronizing signal source 26 is selected or when a holdover has set in, the transmitted flag bit data supplied to the lines to the E and W directions are set to be *S and *S.

The first determination portion 14 and the second determination portion 16 of the stations C and D operate as shown in the same figure. The order of priority for selection of a synchronizing signal source for the stations C and D is such that the line to the W direction is given the highest priority, followed by the line to the E direction and the internal synchronizing signal source 26, in the stated order. When the flag bit data supplied from the line to the W direction is S under the condition that the line to the W direction is operating normally, the line to the W direction is selected as the synchronizing signal source. When the flag bit data supplied from the line to the E direction is S under the condition that both lines to the E and W directions are operating normally, the line to the E direction is selected. The flag bit data supplied from the lines to the E and W directions are both *S under the condition that the line to the W direction and the internal synchronizing signal source 26 are operating normally, the internal synchronizing signal source 26 is selected. When the flag bit data received via the line to the E direction is S under the condition that the line to the W direction is disconnected and the line to the E direction is operating normally, the line to the E direction is selected. Further, when the internal synchronizing signal source 26 is operating normally and the flag bit data supplied from the line to the E direction is *S, the internal synchronizing signal source is selected. When the flag bit data supplied from the line to the E direction is *S under the condition that the internal synchronizing signal source 26 is disconnected, a runaway state sets in. When only the internal synchronizing signal source 26 is operating normally, it is selected.

The second determination portion 16 of the stations C and D operates as shown in the same figure. When the line to the W direction is selected, the flag bit data supplied to the lines to the E and W directions are set to be S and *S, respectively. When the line to the E direction is selected, the flag bit data supplied to the lines to the E and W directions are set to be *S and S, respectively. When the internal synchronizing signal source 26 is selected or when a runaway state has set in, the flag bit data supplied to both lines to the E and W directions are set to be *S.

The flag bit data is defined such that it occupies a fixed position in each frame (for example, the aforementioned reserved bit Z1). Accordingly, each station separates the frame multiplexed line signal into frames so as to detect the flag bit data. Moreover, the flag bit data contains a predetermined code consisting, for example, of only "1's" or of only "0's". It is desirable to employ a decision by majority between "0's" and "1's" in order to make the network be tolerant of a certain degree of data error. For example, consider a case where a flag bit data occupies an information amount of 1 byte (8 bits) in one frame (for example, 19,440 kbps). Assuming that the flag bit data S and *S are defined such that the former consists of only "1's" and the latter consists of only "0's" and that a signal error involves a flag bit data error, a certain degree of tolerance to such an error can be achieved by configuring the process of detection as follows (an error having an error rate of about $1.5 \times 10^{-4}$ can yield a generally unaffected determination).

| flag bit data | detection | error rate |
|---|---|---|
| 8 bits of "1" | S | 0 |
| 7 bits of "1", 1 bit of "0" | S | $5.1 \times 10^{-5}$ |
| 6 bits of "1", 2 bits of "0" | S | $1.0 \times 10^{-4}$ |
| 5 bits of "1", 3 bits of "0" | S | $1.5 \times 10^{-4}$ |
| 4 bits of "1", 4 bits of "0" | indeterminable | $2.1 \times 10^{-4}$ |

In the above-described embodiments, some of the stations allow their internal synchronizing signal sources to be used temporarily during transient stages in which the switching to alternative synchronizing signal sources is proceeding. Even under a normal operation, these internal synchronizing signal sources maintain a high-precision oscillation in sync with the first external synchronizing signal source EXT (P). The above-mentioned process of switching to alternative synchronizing signal sources is completed in an extremely short period of time. Accordingly, the phase shift of the oscillation during the period of switching to alternative synchronizing signal source is negligibly small, thus ensuring quick and reliable switching to alternative synchronizing signal sources.

While only one external synchronizing signal source is assumed to be included in the above-described third and fourth embodiments of a ring mode arrangement, it is obvious that the present invention can be applied to the case where a plurality of synchronizing signal sources are provided.

While the configuration of communication network employed in the above-described embodiments are linear mode arrangement and a ring mode arrangement, it is obvious that the present invention can be applied to a more complex network.

INDUSTRIAL APPLICATION

As is evident from the foregoing description, the present invention enables constructing, with a very simple configuration, a digital communication network using a plurality of synchronizing signal sources and makes it possible to quickly switch to reserved synchronizing signal sources upon an occurrence of a failure in the currently used synchronizing signal source and to provide a communication network having remarkably improved reliability.

We claim:

1. A method of switching from one synchronizing signal source to another in a synchronous data communication network including a plurality of stations with at least one child station and at least one parent station connected to each other via lines, and a plurality of synchronizing signal sources provided for said stations, the method comprising, in combination, steps of:

(a) setting, in a signal transmitted via said lines and including synchronizing information related to one of said plurality of synchronized signal sources, and flag bit data indicative of whether or not a timing of said one of the plurality of synchronizing signal sources related to said synchronizing information transmitted via said lines can be used as a synchronizing signal source on each station which receives said information transmitted via said lines;

(b) referring each station, from among said plurality of stations on the basis of said flag bit data, to a table provided in each said station for specifying an order of priority for selection of a synchronizing signal source, upon occurrence of a predetermined event in any of said plurality of synchronizing signal sources, and for selecting a synchronizing signal source; and (c) switching each station from the currently selected synchronizing signal source to the synchronizing signal source selected in said step (b).

2. The method of switching as claimed in claim 1, wherein, said plurality of synchronizing signal sources include at least one external synchronizing signal source and a plurality of internal synchronizing signal sources, a table for a parent station using the external synchronizing signal source during a normal operation specifies that said external synchronizing signal source be given highest priority and an internal synchronizing signal source from among said plurality of internal synchronizing signal sources be given lowest priority, and a table for child stations receiving said synchronizing signal from other stations specifies that the station that serves as the source of the synchronizing signal during a normal operation be given highest priority and the station that serves as the source synchronizing signal when a failure occurs be given next highest order of priority, and also that, in the case that said child stations include internal synchronizing signal sources, said internal synchronizing signal source be given the lowest order of priority.

3. The method of switching as claimed in claim 2, further comprising steps of:

(d) sending from said parent station, during a normal operation, a first flag bit data S to all neighboring stations to inform neighboring stations that the synchronizing signal from said parent station can be used (e) sending from said parent station when a failure occurs in said external synchronizing signal source, a second flag bit data *S to inform neighboring stations that the synchronizing signal from said parent station cannot be used.

4. The method of switching as claimed in claim 3, further comprising steps of:

(f) having each station select a selected station to receive the synchronizing signal from, from among the neighboring stations, the selection being done in accordance with the table corresponding to said each station when the first flag bit data is received from a neighboring station, (g) having said each station send out the second flag bit data to said selected station, and (h) having said each station send the first flag bit data to a neighboring station other than said selected station.

5. The method of switching as claimed in claim 4, further comprising steps of:

(i) having each station neglect, when the station receives the second flag bit data from the neighboring station, the neighboring station originating the second flag bit data; and (j) operating the child stations by using the internal synchronizing signal source to send out the second flag bit data to their neighboring station.

6. The method of switching as claimed in claim 1, wherein said plurality of stations connected via the lines are in a linear mode arrangement.

7. The method of switching as claimed in claim 1, wherein said plurality of stations connected via the lines are in a ring mode arrangement.

8. The method of switching as claimed in claim 1, wherein said synchronizing signal sources include the external synchronizing signal source connected to a plurality of stations.

9. The method of switching as claimed in claim 1, wherein said synchronizing signal sources include an external synchronizing signal source connected to one station having an internal synchronizing signal source, and said method of switching further comprises a step of switching to said internal synchronizing signal source when a failure occurs in said external synchronizing signal source.

10. A communication apparatus used in a synchronous data communication network having a plurality of synchronizing signal sources, including at least one parent synchronizing signal source and at least one child synchronizing signal source, the apparatus comprising:

first means for receiving flag bit data indicating whether or not a timing of said one of the plurality of synchronizing signal sources related to information in a synchronizing signal transmitted via a line and including information related to one of said plurality of synchronizing signal sources can be used as a synchronizing signal source on each station which receives said information, said synchronizing information being included in the signal transmitted via the line;

second means for specifying an order of priority for selection of a synchronizing signal source;

third means for referring, upon occurrence of a predetermined event in any of said plurality of synchronizing signal sources, to the order of priority for selection of synchronizing signal source, the order being specified by said second means, and for selecting, on the basis of the flag bit data, a synchronizing signal source; and fourth means for sending, in correspondence to the synchronizing signal source selected by the third means, flag bit data, indicating whether or not a timing of said one of the plurality of synchronizing signal sources related to synchronizing information from the communication apparatus originating the flag bit data can be used as a synchronizing signal source on each stations which receives said signal transmitted via said lines, to neighboring communication apparatuses.

11. The communication apparatus as claimed in claim 10, wherein said plurality of synchronizing signal sources include at least one external synchronizing signal source, and the second means of said communication apparatus specifies, when said communication apparatus functions as a parent station using the external synchronizing signal source during a normal operation, that the external synchronizing signal source be given highest priority and the internal synchronizing signal source be given lowest priority.

12. The communication apparatus as claimed in claim 10, wherein the second means of said communication apparatus specifies, when said communication apparatus functions as a child stations receiving the synchronizing signal from another station, that the station that serves as the source of the synchronizing signal during a normal operation be given the highest priority and station that serves as the source of the synchronizing signal when a failure occurs be given next highest priority.

13. The communication apparatus as claimed in claim 11, wherein said communication apparatus further comprises one internal synchronizing signal source, and
the second means of said communication apparatus specifies that said internal synchronizing signal source be given the lowest priority.

14. The communication apparatuses in claim 11, wherein the fourth means of said communication apparatus comprises:
fifth means for having said communication apparatus functioning as the parent station during a normal operation to send, to neighboring stations, the first flag bit data S indicative of availability to inform all of said neighboring stations that the synchronizing signal from said parent station can be used; and
sixth means for having said parent station send, when a failure occurs in said external synchronizing signal source, the second flag bit data *S indicative of the non-availability to neighboring stations to inform all neighboring stations that the synchronizing signal from said parent station cannot be used.

15. The communication apparatus as claimed in claim 10, wherein said third means of said communication apparatus includes fifth means for selecting synchronizing signal sources, other than the synchronizing signal source indicated as not usable by said flag bit data, in accordance with the order of priority specified by said second means.

16. The communication apparatus as claimed in claim 11 wherein the predetermined event is a failure.

17. The communication apparatus as claimed in claim 10 wherein the predetermined event is a failure.

* * * * *

UNITED STATES PATENT AND TRADEMARK OFFICE
CERTIFICATE OF CORRECTION

PATENT NO. : 5,386,418
DATED : January 31, 1995
INVENTOR(S) : Komuro et al.

It is certified that error appears in the above-indentified patent and that said Letters Patent is hereby corrected as shown below:

Column 9, line 47, delete "Band." and insert --B and--.

Signed and Sealed this

Third Day of October, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

| | |
|---|---|
| PATENT NO. | : 5,386,418 |
| APPLICATION NO. | : 08/039374 |
| DATED | : January 31, 1995 |
| INVENTOR(S) | : Yasuko Komuro |

Page 1 of 1

It is certified that error appears in the above-identified patent and that said Letters Patent is hereby corrected as shown below:

In the Claims:

In Claim 1, Col. 18, line 61, delete "and" and insert --a--.

Signed and Sealed this

Fifteenth Day of January, 2008

JON W. DUDAS
*Director of the United States Patent and Trademark Office*